US012711216B2

(12) United States Patent
Sawai

(10) Patent No.: US 12,711,216 B2
(45) Date of Patent: Aug. 18, 2026

(54) INFORMATION PROCESSING SYSTEM, INFORMATION PROCESSING METHOD, AND NON-TRANSITORY COMPUTER-READABLE MEDIUM

(71) Applicant: NEC Corporation, Tokyo (JP)

(72) Inventor: Hiroyoshi Sawai, Tokyo (JP)

(73) Assignee: NEC CORPORATION, Tokyo (JP)

(*) Notice: Subject to any disclaimer, the term of this patent is extended or adjusted under 35 U.S.C. 154(b) by 274 days.

(21) Appl. No.: 18/695,901

(22) PCT Filed: Oct. 29, 2021

(86) PCT No.: PCT/JP2021/040022
§ 371 (c)(1),
(2) Date: Mar. 27, 2024

(87) PCT Pub. No.: WO2023/073921
PCT Pub. Date: May 4, 2023

(65) Prior Publication Data
US 2025/0117465 A1 Apr. 10, 2025

(51) Int. Cl.
*G06F 21/32* (2013.01)
*G06F 16/532* (2019.01)
(Continued)

(52) U.S. Cl.
CPC ............ *G06F 21/32* (2013.01); *G06F 16/532* (2019.01); *G06Q 10/0633* (2013.01); (Continued)

(58) Field of Classification Search
CPC ......... G06Q 10/20; G06Q 50/10; G06F 21/32
See application file for complete search history.

(56) References Cited

U.S. PATENT DOCUMENTS 9,098,584 B1 * 8/2015 Fredinburg ........... G06F 16/532
10,776,613 B1 * 9/2020 Schneider .............. G06Q 50/40
(Continued)

FOREIGN PATENT DOCUMENTS

CN 111665728 * 9/2020 ............. G05B 15/02
JP 2001-186141 A 7/2001
(Continued)

OTHER PUBLICATIONS

International Search Report for PCT Application No. PCT/JP2021/040022, mailed on Jan. 18, 2022.

*Primary Examiner* — Barbara B Anyan

(57) ABSTRACT

An information processing system is configured to: transmit a facility list including facility information regarding one or a plurality of facilities to a user terminal used by a user in a case where a viewing request for facility information regarding a facility that is a reservation candidate has been received from the user terminal; in a case where a reservation request for a designated facility has been received from the user terminal, determine whether or not the facility related to the reservation request is a facility capable of performing face authentication; in a case where the facility related to the reservation request is a facility capable of performing face authentication, increase the number of types of user information that is available to an apparatus of the facility related to the reservation request in a target period determined according to the reservation among pieces of user information regarding the user.

11 Claims, 21 Drawing Sheets

(51) Int. Cl.

| | |
|---|---|
| ***G06Q 10/0633*** | (2023.01) |
| ***G06Q 10/20*** | (2023.01) |
| ***G06Q 30/0601*** | (2023.01) |
| ***G06Q 50/40*** | (2024.01) |

(52) U.S. Cl.
CPC ......... *G06Q 10/20* (2013.01); *G06Q 30/0641* (2013.01); *G06Q 50/40* (2024.01)

(56) References Cited

U.S. PATENT DOCUMENTS

| | | | | |
|---|---|---|---|---|
| 11,170,593 B1* | 11/2021 | Schneider | .............. | H04N 7/186 |
| 2018/0308100 A1* | 10/2018 | Haukioja | ............... | G06N 20/00 |
| 2021/0042673 A1* | 2/2021 | Lieberman | ......... | G06Q 10/0633 |
| 2022/0270161 A1* | 8/2022 | Zhang | ................ | G06Q 30/0641 |

FOREIGN PATENT DOCUMENTS

| | | |
|---|---|---|
| JP | 2002-207947 A | 7/2002 |
| WO | 2020/179333 A1 | 9/2020 |

* cited by examiner

| FACE AUTHENTICATION PROPRIETY INFORMATION | USE AUTHORITY | |
|---|---|---|
| POSSIBLE | ATTRIBUTE INFORMATION | BEHAVIOR HISTORY |
| IMPOSSIBLE | ATTRIBUTE INFORMATION | — |

Fig. 10

| HOLE | PREVIOUS | | CURRENT | |
|---|---|---|---|---|
| | PAR | SCORE | PAR | SCORE |
| 1 | 4 | 4 | 4 | 6 |
| 2 | 4 | 5 | 3 | 4 |
| 3 | 5 | 5 | 4 | 5 |
| ... | | | | |

| LOCATION ID | STATUS | CONTENT OF PROCESSING |
|---|---|---|
| A1 | NOT CHECKED IN | CHECK-IN |
| A1 | CHECKED IN | CHECK-OUT |
| A2 | LOCKED STATE | UNLOCKING |
| A3 | - | REGISTRATION OF PAYMENT INFORMATION |
| A4 | FIRST HOLE | SCORE RECORDING |
| A5 | SECOND HOLE | SCORE RECORDING |
| ... | ... | ... |
| A12 | NINTH HOLE | SCORE RECORDING, BREAK ANNOUNCEMENT, AGGREGATION OF INTERMEDIATE PROGRESS |
| ... | ... | ... |
| A21 | EIGHTEENTH HOLE | SCORE RECORDING, AGGREGATION, TRANSMISSION OF AGGREGATION RESULTS |

Fig. 19

INFORMATION PROCESSING SYSTEM, INFORMATION PROCESSING METHOD, AND NON-TRANSITORY COMPUTER-READABLE MEDIUM

This application is a National Stage Entry of PCT/JP2021/040022 filed on Oct. 29, 2021, the contents of all of which are incorporated herein by reference, in their entirety.

TECHNICAL FIELD

The present disclosure relates to an information processing system, an information processing method, and a non-transitory computer-readable medium.

BACKGROUND ART

In recent years, utilizing face authentication for labor saving or unmanned operation in facilities such as hotels and pools has attracted attention. For example, Patent Literature 1 discloses a fare adjustment system that acquires face information of a customer from a biological information acquisition apparatus installed in each of facilities, and adjusts a fare such as a facility usage fee for the customer or unlocks an entrance on the basis of specifying the customer through collation of the face information.

CITATION LIST

Patent Literature

Patent Literature 1: Japanese Unexamined Patent Application Publication No. 2002-207947

SUMMARY OF INVENTION

Technical Problem

Here, in a facility, there is a need to collect a large amount of customer data of customers and use the collected customer data for services in the facility. In order to collect a large amount of customer data, it is conceivable to collect and share customer data among a plurality of facilities. However, since customer data is personal information with high confidentiality and needs to be handled strictly, there is a problem in smoothly using customer data collected in a plurality of facilities. There is a similar problem in service provision in a facility utilizing face authentication.

In view of the above-described problems, an object of the present disclosure is to provide an information processing system, an information processing method, and a non-transitory computer-readable medium that facilitate use of customer data for providing a service in a facility.

Solution to Problem

According to aspect of the present disclosure, there is provided an information processing system including:

list transmission means for transmitting a facility list including facility information regarding one or a plurality of facilities to a user terminal used by a user in a case where a viewing request for facility information regarding a facility that is a reservation candidate has been received from the user terminal;

determination means for, in a case where a reservation request for a designated facility has been received from the user terminal, determining whether or not the facility related to the reservation request is a facility capable of performing face authentication; and usage control means for, in a case where the facility related to the reservation request is a facility capable of performing face authentication, increasing the number of types of user information that is available to an apparatus of the facility related to the reservation request in a target period determined according to the reservation among pieces of user information regarding the user, the user information being registered in association with face information of the user, compared with a case where the facility related to the reservation request is not a facility capable of performing the face authentication.

According to another aspect of the present disclosure, there is provided an information processing method including:

transmitting a facility list including facility information regarding one or a plurality of facilities to a user terminal used by a user in a case where a viewing request for facility information regarding a facility that is a reservation candidate has been received from the user terminal;

in a case where a reservation request for a designated facility has been received from the user terminal, determining whether or not the facility related to the reservation request is a facility capable of performing face authentication; and in a case where the facility related to the reservation request is a facility capable of performing face authentication, increasing the number of types of user information that is available to an apparatus of the facility related to the reservation request in a target period determined according to the reservation among pieces of user information regarding the user, the user information being registered in association with face information of the user, compared with a case where the facility related to the reservation request is not a facility capable of performing the face authentication.

According to still another aspect of the present disclosure, there is provided a non-transitory computer-readable medium storing a program for causing a computer to execute:

a procedure of transmitting a facility list including facility information regarding one or a plurality of facilities to a user terminal used by a user in a case where a viewing request for facility information regarding a facility that is a reservation candidate has been received from the user terminal;

a procedure of, in a case where a reservation request for a designated facility has been received from the user terminal, determining whether or not the facility related to the reservation request is a facility capable of performing face authentication; and a procedure of, in a case where the facility related to the reservation request is a facility capable of performing face authentication, increasing the number of types of user information that is available to an apparatus of the facility related to the reservation request in a target period determined according to the reservation among pieces of user information regarding the user, the user information being registered in association with face information of the user, compared with a case where the facility related to the reservation request is not a facility capable of performing the face authentication.

Advantageous Effects of Invention

According to the present disclosure, it is possible to provide an information processing system, an information processing method, and a non-transitory computer-readable medium that facilitate use of customer data for providing a service in a facility.

BRIEF DESCRIPTION OF DRAWINGS

FIG. 10 is a diagram illustrating an example of a rule of a data use authority according to the second example embodiment.

FIG. 19 is a diagram illustrating an example of content of processing for each location according to a third example embodiment.

EXAMPLE EMBODIMENT

Figure 1:
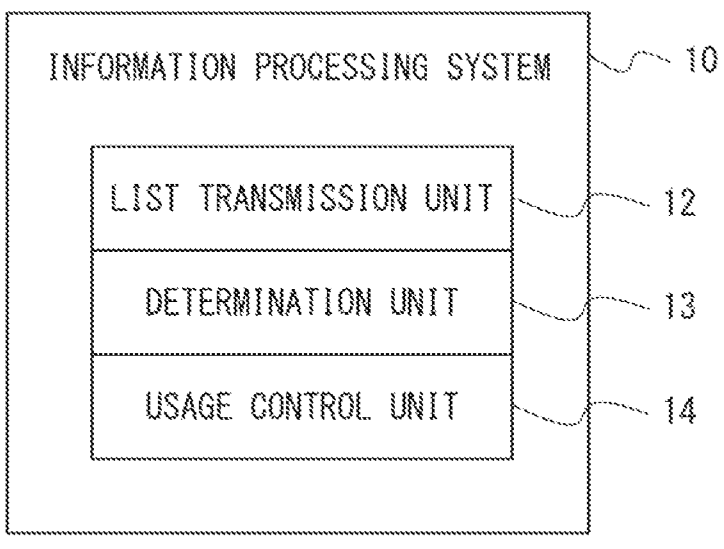
FIG. 1 is a block diagram illustrating a configuration of an information processing system according to a first example embodiment.

Example embodiments of the present disclosure will be described in detail below with reference to the drawings. In the drawings, the same or corresponding elements are denoted by the same reference numerals and signs and redundant description of the elements will be omitted according to necessity for clarity of description.

Description of Terms

Hereinafter, the following terms are used as follows.

A "facility" is a facility or a store that provides a predetermined service to a user who has registered a reservation when the user comes at the reservation date and time. As an example, the "facility" is a golf course, a hotel, a fitness gym, or a conference room.

"Facility information" is information regarding a facility. The "facility information" includes, for example, a facility name, an address, the type of service, a price, access information, and facility guidance. The "facility information" may include evaluation ranks for a facility such as three stars or five stars, or word-of-mouth information for the facility. The "facility information" may include information regarding features of target users of a facility, such as information for a beginner or for a child.

First Example Embodiment

First, a first example embodiment of the present disclosure will be described. FIG. 1 is a block diagram illustrating a configuration of an information processing system 10 according to the first example embodiment. The information processing system 10 is a computer system including one or a plurality of computer apparatuses that execute a facility reservation process. The information processing system 10 is connected to a network (not illustrated). The network may be a wired network or a wireless network. A user terminal (not illustrated) used by a user and one or a plurality of facility terminals (not illustrated) are connected to the network. Each facility terminal is a computer apparatus installed in a facility or a computer apparatus used by an administrator of the facility. The facility terminal will also be referred to as an apparatus of a facility.

The information processing system 10 includes a list transmission unit 12, a determination unit 13, and a usage control unit 14.

The list transmission unit 12 will also be referred to as list transmission means. In a case where a viewing request for facility information regarding a facility that is a reservation candidate has been received from a user terminal, the list transmission unit 12 transmits a facility list to the user terminal. The facility list is data including facility information regarding one or a plurality of facilities. Here, in a case where the user terminal accesses a reservation website or in a case where the user terminal accesses the reservation website and designates a desired condition such as a place or a price range, a viewing request for the facility information may be transmitted from the user terminal to the list transmission unit 12. The facility that is a reservation candidate may be a facility that can be currently reserved or a facility that satisfies a desired condition when the desired condition is designated. A user designates a facility for reservation from the facility list.

The determination unit 13 will also be referred to as determination means. In a case where a reservation request for the designated facility has been received from the user terminal, the determination unit 13 determines whether or not the facility related to the reservation request is a facility capable of performing face authentication. The reservation request is, that is, reservation application. The facility capable of performing face authentication is a facility that provides a service to a user who has visited the facility on the basis of customer data of a customer specified through the face authentication. A facility terminal of the facility capable of performing the face authentication is configured to perform processing based on the customer data of the customer specified through the face authentication, and to perform predetermined processing for providing a service. The facility terminal of the facility capable of performing the face authentication performs at least a process of acquiring a captured image obtained by imaging a face of a user, but does not necessarily perform all processes of the face authentication. For example, the facility terminal of the facility capable of performing the face authentication may transmit the captured image to another apparatus and cause another apparatus to perform subsequent processes. For example, the facility terminal of the facility capable of performing the face authentication extracts face feature information from the captured image, but another apparatus may perform the subsequent processes.

Hereinafter, a facility related to the reservation request may be referred to as a "designated facility", a facility capable of performing the face authentication may be referred to as a "face authentication supporting facility", and a facility incapable of performing face authentication may be referred to as a "face authentication non-supporting facility".

The usage control unit 14 will also be referred to as usage control means. The usage control unit 14 performs control such that the apparatus (that is, the facility terminal of the designated facility) of the designated facility can use predetermined user information in a target period determined according to the reservation.

The "target period" is determined according to reservation application date and time or reservation date and time. For example, the target period is a period including at least reservation date and time. As an example, the target period is a period from the reservation application date and time to the end time of the reservation date.

The "user information" is information regarding a user, and includes attribute information of the user and behavior history information of the user. The behavior history information is information regarding entrance, payment, or other behavior performed by the user in the past. The user information may include information regarding a credit card number of the user. The user information is registered in association with the face information of the user.

"Performing control such that the facility terminal can use the predetermined user information" may be transmitting the predetermined user information to the facility terminal or giving the facility terminal a use authority to refer to the predetermined user information. "Performing control such that the facility terminal can use the predetermined user information" may be transmitting information generated through information processing based on the predetermined user information to the facility terminal or giving the facility terminal a use authority to refer to the information in order to provide a service of the facility.

In a case where the designated facility is a face authentication supporting facility, the usage control unit 14 increases the number of types of user information that can be used by the facility terminal of the designated facility in the target period among the pieces of registered user information described above compared with a case where the designated facility is a face authentication non-supporting facility. For example, in a case where the designated facility is a face authentication non-supporting facility, the usage control unit 14 sets a use authority such that the facility terminal of the designated facility can use attribute information of the user in the target period. On the other hand, in a case where the designated facility is a face authentication supporting facility, the usage control unit 14 sets a use authority such that the facility terminal of the designated facility can use attribute information and behavior history of the user in the target period. The attribute information and the behavior history of the user are used to provide a service to the user who has reserved the facility in the facility. Note that there may be a configuration in which the user can select permission or non-permission of data use comprehensively or for each reservation request in advance. In this case, in a case where the user consents to use the data, the use authority for the behavior history of the user may be given to the facility terminal of the designated facility, and when the user does not consent to use the data, the use authority for the behavior history of the user needs not be given to the facility terminal of the designated facility.

Figure 2:
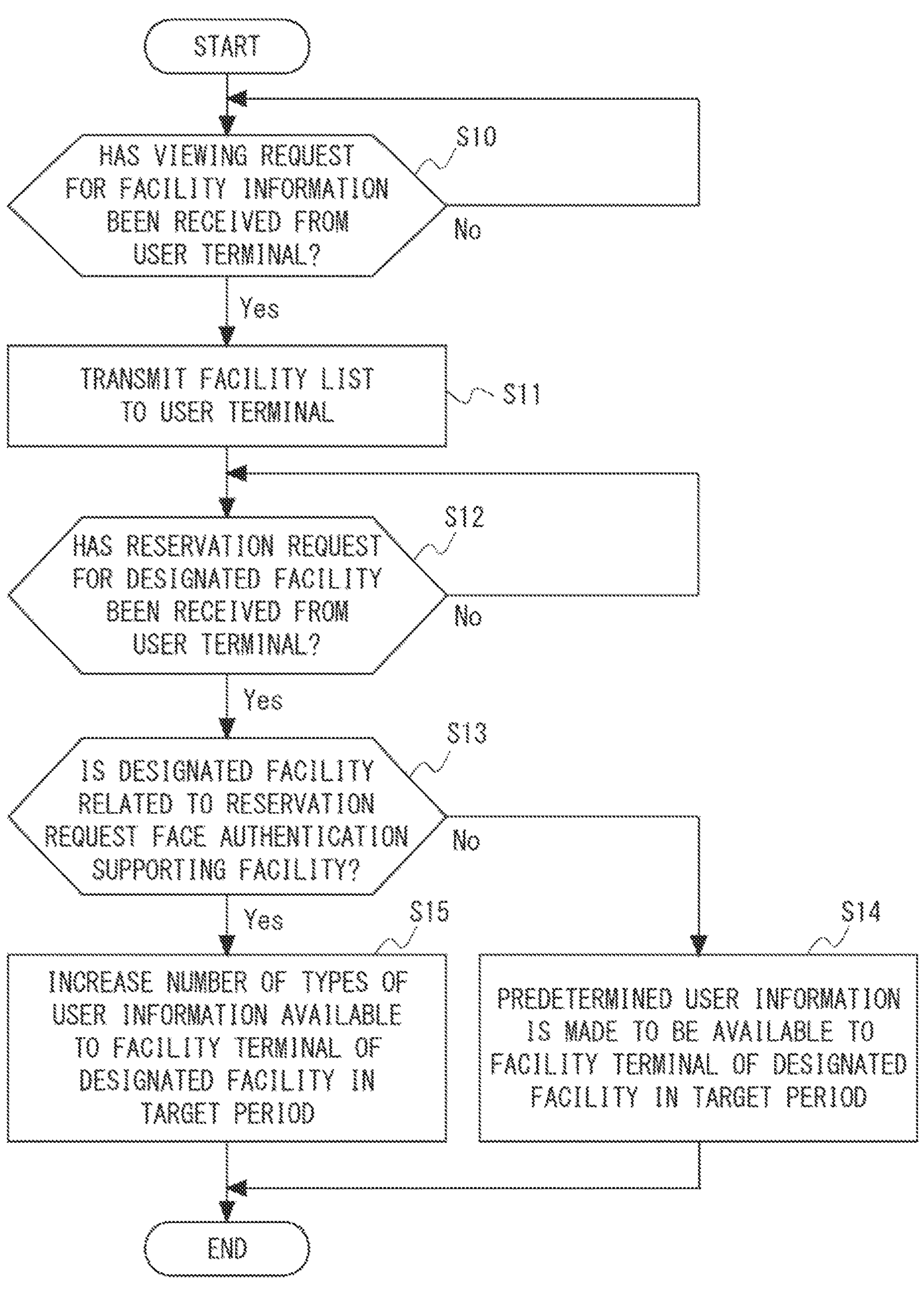
FIG. 2 is a flowchart illustrating a flow of an information processing method according to the first example embodiment.

FIG. 2 is a flowchart illustrating a flow of an information processing method according to the first example embodiment. First, the list transmission unit 12 of the information processing system 10 determines whether a viewing request for facility information has been received from the user terminal (S10). In a case where the viewing request for the facility information has not been received (No in S10), the list transmission unit 12 repeats the processing illustrated in S10.

On the other hand, in a case where the viewing request for the facility information has been received (Yes in S10), the list transmission unit 12 transmits a facility list to the user terminal (S11). Next, the determination unit 13 determines whether a reservation request for the designated facility has been received from the user terminal (S12). In a case where the reservation request has not been received (No in S12), the list transmission unit 12 repeatedly performs the process in S12.

On the other hand, in a case where the reservation request has been received (Yes in S12), the determination unit 13 determines whether the designated facility related to the reservation request is a face authentication supporting facility (S13). In a case where the designated facility is not a face authentication supporting facility (No in S13), the usage control unit 14 sets a use authority such that predetermined user information among pieces of user information registered in association with the user's face can be used by the facility terminal of the designated facility in the target period (S14). The usage control unit 14 ends the process. On the other hand, in a case where the designated facility is a face authentication supporting facility (Yes in S13), the usage control unit 14 increases the number of types of user information that can be used by the facility terminal of the designated facility in the target period among the pieces of user information registered in association with the user's face (S15). The usage control unit 14 ends the process.

As described above, according to the first example embodiment, the information processing system 10 automatically increases the number of types of customer data that is the basis of service provision for a user who has reserved a facility in a case where a face authentication supporting facility is reserved compared with a case where a face authentication non-supporting facility is reserved, and makes the customer data available to the facility terminal. Therefore, by providing the minimum user information necessary for completing a reservation to a face authentication non-supporting facility, it is possible to prevent the non-intended use of customer data. On the other hand, it is possible to smoothly collect customer data to be utilized for service provision in a face authentication supporting facility and to smoothly use the customer data.

Second Example Embodiment

Figure 3:
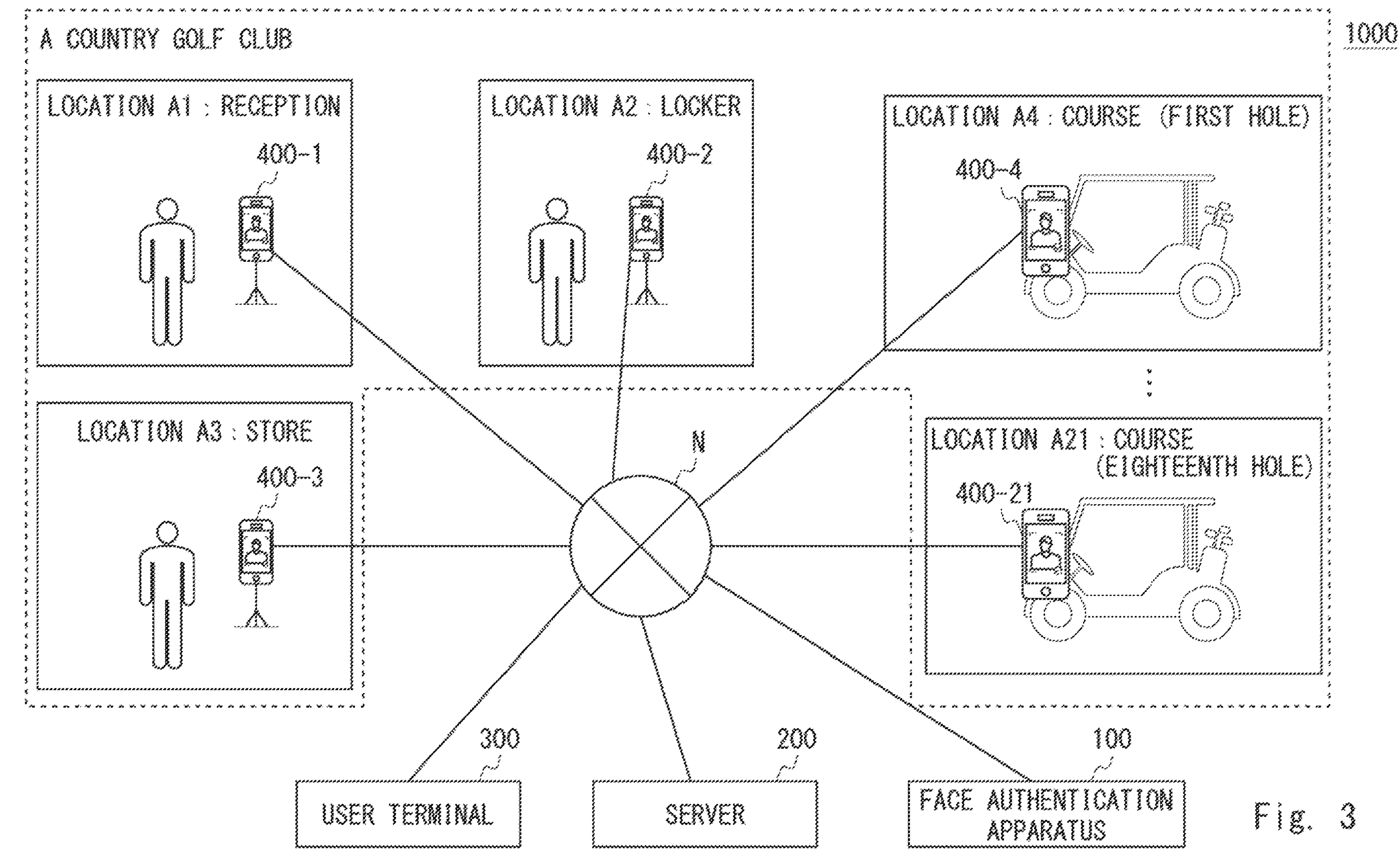
FIG. 3 is a block diagram illustrating an overall configuration of an information processing system according to a second example embodiment.

Next, a second example embodiment of the present disclosure will be described. FIG. 3 is a block diagram illustrating an overall configuration of an information processing system 1000 according to the second example embodiment. The information processing system 1000 is a computer system that executes processes from a facility reservation process to information processing for providing a service in a facility. In the second example embodiment, without limitation, the facility is a golf course, and the behavior history includes a score history of golf. The information processing system 1000 executes a reservation process on the golf course in response to a reservation request from a user. In a case where the user reserves "A country golf club" that is a golf course supporting face authentication, the information processing system 1000 performs face authentication for the user who has come at the reservation date and time, and provides a service based on user information of the specified user.

The information processing system 1000 includes a user terminal 300, facility terminals 400-1,400-2, . . . , and 400-21 located at respective locations A1, A2, . . . , and A21 on the site of the "A country golf club", a face authentication apparatus 100, and an information processing apparatus (hereinafter, referred to as a server) 200. The apparatuses and the terminals are connected to each other via a network N. Here, the network N is a wired or wireless communication line.

The user terminal 300 is an information terminal used by a user.

The user terminal 300 transmits a user registration request to the server 200. As a result, face feature information of the user is registered, and a user ID is issued. The user terminal 300 transmits user information such as attribute information and a credit card number to the server 200, and causes the server 200 to register the user information in association with the user ID.

In a case where the user desires to view the facility information in order to examine the facility reserved by the user, the user terminal 300 transmits a viewing request for the facility information to the server 200. As a result, the user terminal 300 receives a facility list from the server 200 and displays the facility list. The user views the facility list and designates the facility related to the reservation. As a result, the user terminal 300 transmits a reservation request for the designated facility to the server 200, and a reservation process on the designated facility is executed in the server 200.

The facility terminals 400-1, 400-2, . . . , and 400-21 are information terminals located at the locations A1, A2, . . . , and A21 of the "A country golf club", respectively. The locations A1 to A21 are locations where cameras that generate captured images for face authentication are installed. Each of the facility terminals 400-1,400-2, . . . , and 400-21 located at the locations A1, A2, . . . , and A21 acquires a captured image for face authentication of a user who has visited the location from the camera provided at the location.

At least some of the facility terminals 400-1 to 400-21 display user information within the use authority for the user specified through the face authentication. For example, at the location A1 where there is reception, the facility terminal 400-1 displays a user name of the user specified through the face authentication, and executes a check-in process. In a golf cart located at the location A4 where a first hole in the course is located, the facility terminal 400-4 displays the previous score history of the user specified through the face authentication. In a golf cart located at the location A21 where an eighteenth hole in the course is located, the facility terminal 400-21 displays a result of counting the current score of the user specified through the face authentication. Note that the facility terminal 400-4 and the facility terminal 400-21 may be the same terminal apparatus as long as the apparatuses are installed in the same golf cart. Instead of displaying the user information within the use authority, the facility terminal 400 may provide a service personalized to the user through information processing based on the user information within the use authority.

At least some of the facility terminals 400-1 to 400-21 acquires behavior data of the user at the locations thereof, transmits the behavior data to the server 200, and records the behavior data as a behavior history. For example, at the location A2 where there is a locker, the facility terminal 400-2 causes the server 200 to record a locked state of the locker in association with the user specified through the face authentication. At the location A3 where there is a store, the facility terminal 400-3 causes the server 200 to record a usage statement at the store in association with the user specified through the face authentication. In the golf cart located at the location A4 where the first hole in the course is located, the facility terminal 400-4 causes the server 200 to record the input score at the first hole in association with the user specified through the face authentication.

The face authentication apparatus 100 is a computer apparatus that stores face feature information of a plurality of persons. The face authentication apparatus 100 has a face authentication function of collating a face image or face feature information included in a face authentication request received from the outside with face feature information of each user in response to the face authentication request. In the second example embodiment, the face authentication apparatus 100 registers face feature information of a user at the time of user registration. The face authentication apparatus 100 acquires a captured image of a user who has visited a location from the facility terminal 400 at each location via the server 200, and executes face authentication using a face region in the captured image. The face authentication apparatus 100 returns a collation result (face authentication result) to the server 200.

The server 200 is a computer apparatus that executes a reservation process for the golf course and gives a facility terminal of a reserved designated facility a use authority for user information.

The server 200 specifies a user by performing face authentication on a user who has come at the reservation date and time, reads user information within the use authority for the user, and provides the user information to the facility terminal 400.

The server 200 records behavior data of the user acquired from the facility terminal 400 as a behavior history in association with the user specified through the face authentication.

Figure 4:
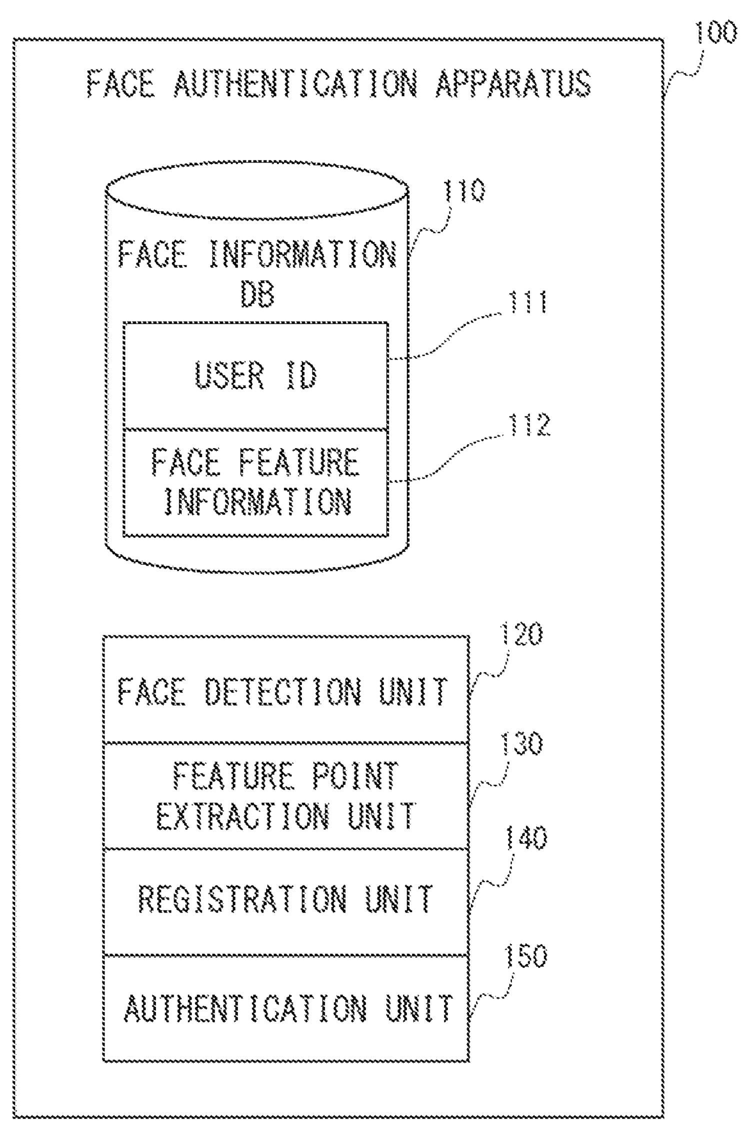
FIG. 4 is a block diagram illustrating a configuration of a face authentication apparatus according to the second example embodiment.

FIG. 4 is a block diagram illustrating a configuration of the face authentication apparatus 100 according to the second example embodiment. The face authentication apparatus 100 includes a face information database (DB) 110, a face detection unit 120, a feature point extraction unit 130, a registration unit 140, and an authentication unit 150. The face information DB 110 stores a user ID 111 and face feature information 112 of the user ID in association with each other. The face feature information 112 is a set of feature points extracted from a face image, and is an example of face information. Note that the face authentication apparatus 100 may delete the face feature information 112 in the face feature DB 110 in response to a request from a user whose face feature information 112 is registered. Alternatively, the face authentication apparatus 100 may delete the face feature information 112 after a lapse of a certain period from the registration of the face feature information 112.

The face detection unit 120 detects a face region included in a registration image for registering face information, and outputs the face region to the feature point extraction unit 130. The feature point extraction unit 130 extracts a feature point from the face region detected by the face detection unit 120, and supplies face feature information to the registration unit 140. The feature point extraction unit 130 extracts feature points included in the captured image received from the server 200, and supplies the face feature information to the authentication unit 150.

The registration unit 140 issues the new user ID 111 when the face feature information is registered. The registration unit 140 registers the issued user ID 111 and the face feature information 112 extracted from the registration image in the face information DB 110 in association with each other. The authentication unit 150 performs face authentication using the face feature information 112. Specifically, the authentication unit 150 collates the face feature information extracted from the captured image with the face feature information 112 in the face information DB 110. The authentication unit 150 returns whether or not the pieces of face feature information match to the server 200. Whether or not the pieces of face feature information match corresponds to whether or not authentication has succeeded or failed. A case where the pieces of face feature information match indicates a case where the degree of matching is equal to or more than a predetermined value.

Figure 5:
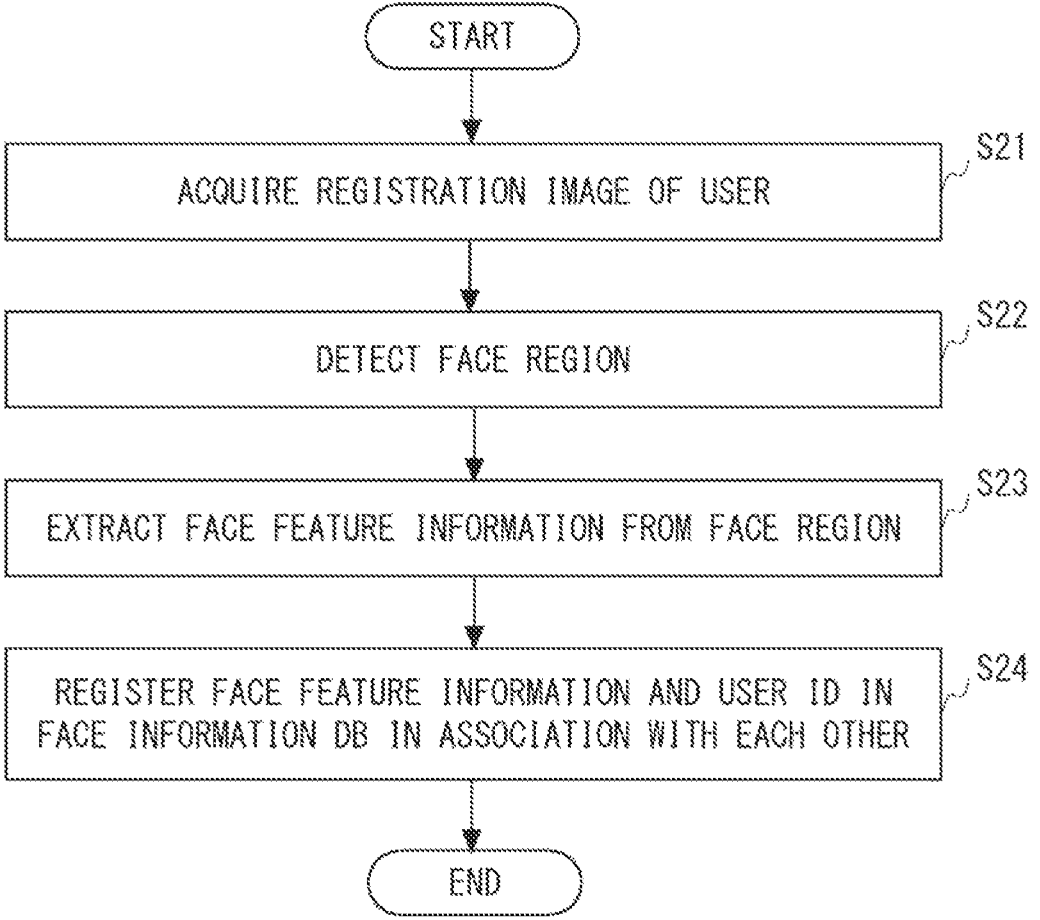
FIG. 5 is a flowchart illustrating a flow of a face information registration process according to the second example embodiment.

FIG. 5 is a flowchart illustrating a flow of a face information registration process according to the second example embodiment. First, the face authentication apparatus 100 acquires a registration image of a user U included in a face registration request (S21). For example, the face authentication apparatus 100 receives the face registration request from the server 200 that has received a user registration request from the user terminal 300 via the network N. The face authentication apparatus 100 is not limited thereto, and may directly receive the face registration request from the user terminal 300. Next, the face detection unit 120 detects a face region included in the registration image (S22). Next, the feature point extraction unit 130 extracts a feature point from the face region detected in step S22 and supplies face feature information to the registration unit 140 (S23). Finally, the registration unit 140 issues the user ID 111, and registers the user ID 111 and the face feature information 112 in the face information DB 110 in association with each other (S24). The face authentication apparatus 100 may receive the face feature information 112 from a face registration request source and register the face feature information 112 in the face information DB 110 in association with the user ID 111.

Figure 6:
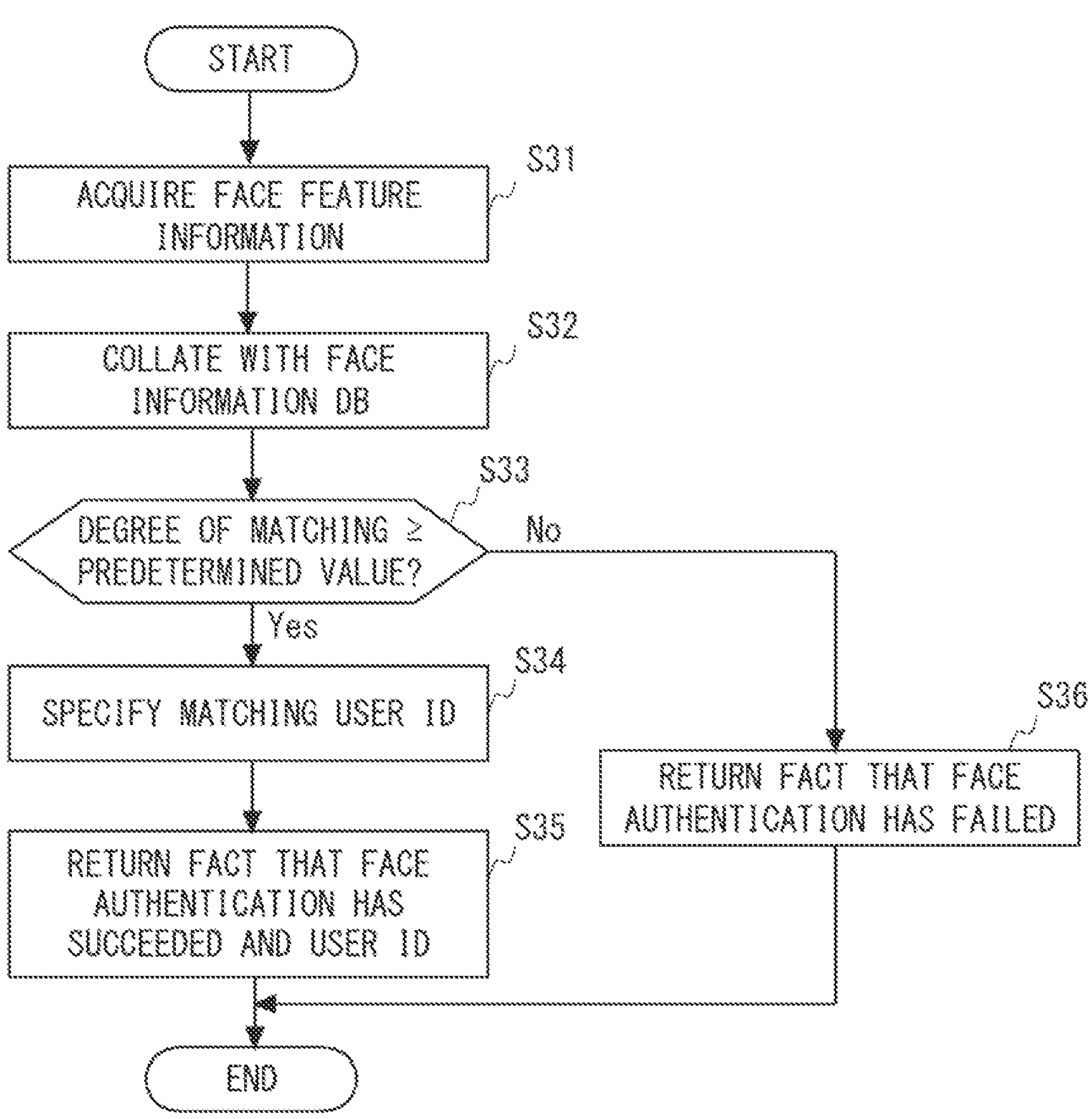
FIG. 6 is a flowchart illustrating a flow of a face authentication process according to the second example embodiment.

FIG. 6 is a flowchart illustrating a flow of a face authentication process according to the second example embodiment. First, the feature point extraction unit 130 acquires face feature information for authentication (S31). For example, the face authentication apparatus 100 receives a face authentication request from the server 200 via the network N, and extracts face feature information from a captured image included in the face authentication request as in steps S21 to S23. Alternatively, the face authentication apparatus 100 may receive the face feature information from the server 200. Next, the authentication unit 150 collates the acquired face feature information with the face feature information 112 in the face information DB 110 (S32). In a case where the pieces of face feature information match, that is, the degree of matching between the pieces of face feature information is equal to or more than a predetermined value (Yes in S33), the authentication unit 150 specifies the user ID 111 of the user whose face feature information matches (S34). The authentication unit 150 returns the fact that the face authentication has succeeded and the specified user ID 111 to the server 200 as a face authentication result (S35). In a case where there is no matching face feature information (No in S33), the authentication unit 150 returns the fact that the face authentication has failed to the server 200 as a face authentication result (S36).

Figure 7:
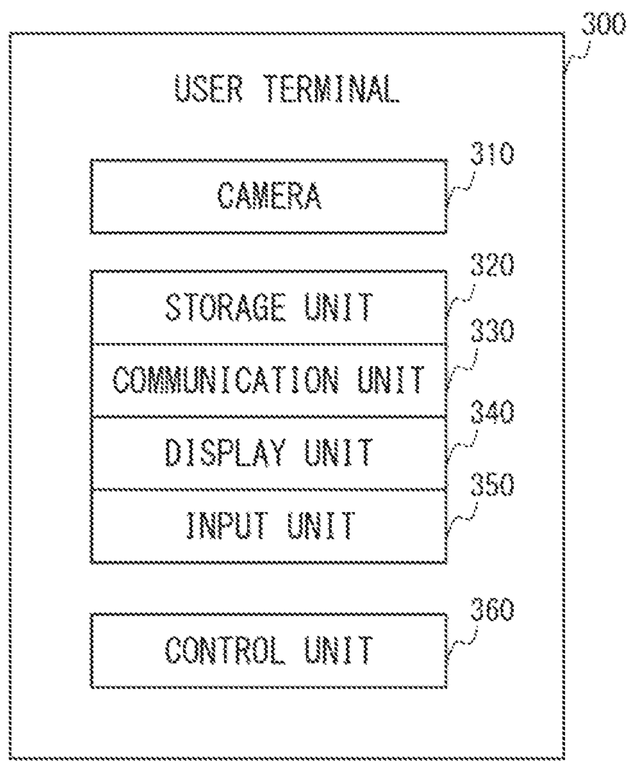
FIG. 7 is a block diagram illustrating a configuration of a user terminal according to the second example embodiment.

FIG. 7 is a block diagram illustrating a configuration of the user terminal 300 according to the second example embodiment. The user terminal 300 includes a camera 310, a storage unit 320, a communication unit 330, a display unit 340, an input unit 350, and a control unit 360.

The camera 310 is an imaging apparatus that performs imaging under the control of the control unit 360. The storage unit 320 is a storage apparatus that stores a program for realizing each function of the user terminal 300. The communication unit 330 is a communication interface with the network N. The display unit 340 is a display apparatus. The input unit 350 is an input apparatus that receives an input from a user. The display unit 340 and the input unit 350 may be integrally configured similarly to a touch panel. The control unit 360 controls hardware included in the user terminal 300.

Figure 8:
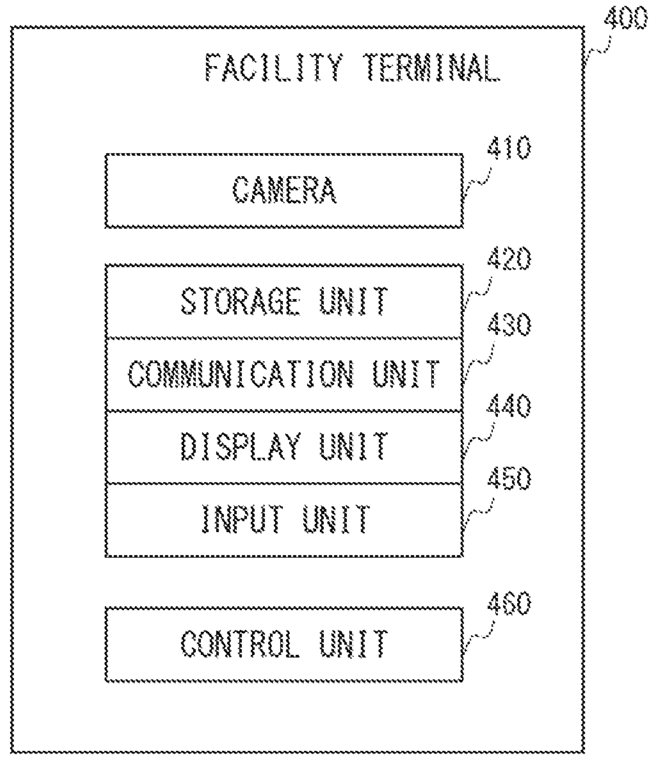
FIG. 8 is a block diagram illustrating a configuration of a facility terminal according to the second example embodiment.

FIG. 8 is a block diagram illustrating a configuration of the facility terminal 400 according to the second example embodiment. The facility terminal 400 includes a camera 410, a storage unit 420, a communication unit 430, a display unit 440, an input unit 450, and a control unit 460.

The camera 410 is an imaging apparatus that performs imaging under the control of the control unit 460. The storage unit 420 is a storage apparatus that stores a program for realizing each function of the facility terminal 400. The communication unit 430 is a communication interface with the network N. The display unit 440 is a display apparatus. The input unit 450 is an input apparatus that receives an input. The display unit 440 and the input unit 450 may be integrally configured similarly to a touch panel. The control unit 460 controls hardware included in the facility terminal 400.

Figure 9:
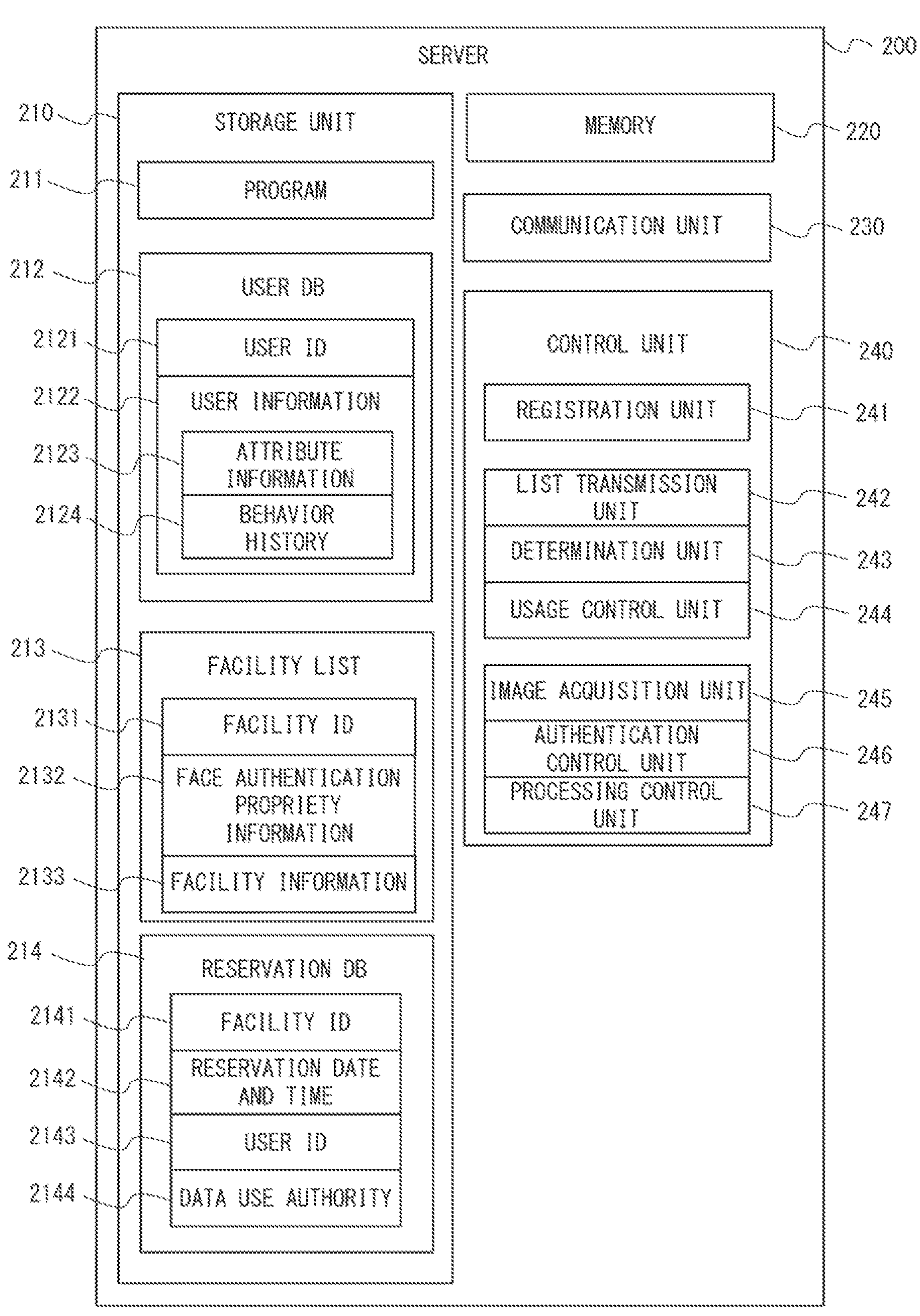
FIG. 9 is a block diagram illustrating a configuration of a server according to the second example embodiment.

FIG. 9 is a block diagram illustrating a configuration of the server 200 according to the second example embodiment. The server 200 includes a storage unit 210, a memory 220, a communication unit 230, and a control unit 240. The storage unit 210 is a storage apparatus such as a hard disk or a flash memory. The storage unit 210 stores a program 211, a user DB 212, a facility list 213, and a reservation DB 214. The program 211 is a computer program in which processing of the information processing method according to the second example embodiment is implemented.

The user DB 212 stores information regarding a user. Specifically, the user DB 212 stores user information 2122 in association with a user ID 2121. Therefore, the user information 2122 is associated with the face feature information 112 in the face information DB 110 of the face authentication apparatus 100 via the user ID 2121. The user ID 2121 is a user ID issued by the face authentication apparatus 100 at the time of face information registration. The user information 2122 is an example of the user information described above, and includes, for example, attribute information 2123 and a behavior history 2124. The attribute information 2123 may include an age, an address, a gender, an occupation, a height, a weight, or a foot size. The behavior history 2124 may include an entry history of a user to each location, a payment history at a store, and a score history in a course. The behavior history 2124 may include measurement data generated by measuring a motion of a sport performed at a location or analysis data obtained by analyzing the measurement data. The user information 2122 is not limited to the attribute information 2123 and the behavior history 2124, and may include personal information such as a credit card number of a user.

The facility list 213 indicates information regarding one or a plurality of facilities. Specifically, the facility list 213 includes face authentication propriety information 2132 and facility information 2133 for each facility ID 2131. The face authentication propriety information 2132 is information indicating whether or not the facility is a facility capable of performing face authentication. The facility information 2133 is an example of the facility information described above, and includes a facility name, an address, the type of service, a price, access information, and facility guidance.

The reservation DB 214 stores information regarding facility reservation. Specifically, the reservation DB 214 stores reservation date and time 2142, a user ID 2143 of a user who has reserved a facility, and a data use authority 2144 in association with the facility ID 2141.

The data use authority 2144 is information indicating for which type of information a use authority is given to the facility in a target period among the pieces of user information 2122 stored in the user DB 212. The data use authority 2144 is determined on the basis of a rule of a predetermined data use authority.

FIG. 10 is a diagram illustrating an example of a rule of a data use authority according to the second example embodiment. For example, a use authority for the attribute information and the behavior history of a user who has reserved a facility is given to a face authentication supporting facility in which the face authentication propriety information is "possible". On the other hand, a use authority for the attribute information of a user who has reserved a facility is given to a face authentication non-supporting facility in which the face authentication propriety information is "impossible", and a use authority for the behavior history is not given thereto.

Note that a rule of a data use authority is not limited thereto, and may take various forms. For example, even in a face authentication supporting facility, the use authority needs not be given to the behavior history that is not necessary for service provision among the behavior histories. For example, even in a face authentication non-supporting facility, the use authority may be given to a part of the behavior history such as the number of times of use of the facility, but the use authority needs not be given to a part of the behavior history such as the score history. For example, the use authority may be given to the face authentication non-supporting facility for the attribute information used in the reservation process, such as the user name and the address, but the use authority needs not be given to the attribute information not used in the reservation process.

A rule of a data use authority may be determined for each facility according to information necessary for service provision or a reservation process determined for each facility. As a result, it is possible to allow the facility terminal to use minimum user information necessary for processing, and it is possible to curb sharing of information unnecessary for processing. A rule of a data use authority may be determined for each user according to information accepted by a user for use. As a result, service provision or the reservation process based on the intention of the user can be smoothly executed.

Returning to FIG. 9, the description will be continued. The memory 220 is a volatile storage apparatus such as a random access memory (RAM), and is a storage area for temporarily storing information during an operation of the control unit 240. The communication unit 230 is a communication interface with the network N.

The control unit 240 is a processor, that is, a control apparatus that controls each constituent of the server 200. The control unit 240 reads a program 211 from the storage unit 210 into the memory 220 and executes the program 211. As a result, the control unit 240 realizes the functions of a registration unit 241, a list transmission unit 242, a determination unit 243, a usage control unit 244, an image acquisition unit 245, an authentication control unit 246, and a processing control unit 247.

The registration unit 241 will also be referred to as registration means. In a case where a registration image has been received from the user terminal 300, the registration unit 241 transmits a face registration request to the face authentication apparatus 100. In a case where the face authentication apparatus 100 registers face information and issues a user ID, the registration unit 241 registers the user ID in the user DB 212. In a case where the user registration request has been received from the user terminal 300, the registration unit 241 registers the user information of the user in the user DB 212 in association with the user ID of the user used by the user terminal 300. Since the user ID is associated with the face information in the face authentication apparatus 100, the registration unit 241 registers the user information regarding the user for each user in association with the face information of the user via the user ID.

The list transmission unit 242 is an example of the list transmission unit 12 described above. In a case where a viewing request for the facility information has been received from the user terminal 300, the list transmission unit 242 transmits the facility list data to the user terminal 300. The facility list data transmitted here may be all information included in the facility list 213 or may be some information. For example, the facility list data includes a facility ID and facility information among the pieces of information included in the facility list 213, but does not need to include the face authentication propriety information. Alternatively, the facility list data may include the facility ID, the facility information, and the face authentication propriety information in association with each other. In a case where the face authentication propriety information is included in the facility list data, the face authentication propriety information is displayed on the user terminal 300 in association with the facility information of each facility, and thus a user can easily ascertain whether or not the facility supports the face authentication. For example, the facility list data may include information regarding facilities having a vacant reservation among the facilities registered in the facility list 213, and does not need to include information regarding facilities having no vacant reservation. As a result, a user can easily ascertain a facility that can be reserved.

The determination unit 243 is an example of the determination unit 13 described above. In a case where the reservation request for the designated facility has been received from the user terminal 300, the determination unit 243 refers to the face authentication propriety information 2132 of the facility list 213 and determines whether or not the designated facility is a face authentication supporting facility.

The usage control unit 244 is an example of the usage control unit 14 described above. In a case where the designated facility is a face authentication supporting facility, the usage control unit 244 gives the facility terminal 400 of the designated facility a use authority for the attribute information and the behavior history included in the user information in the user DB 212 in the target period. In this case, the usage control unit 244 records, in the data use authority 2144 of the reservation DB 214, that the use authority for the attribute information and the behavior history of the user who has reserved the facility has been given. In a case where the designated facility is not a face authentication supporting facility, the usage control unit 244 does not give the facility terminal of the designated facility the use authority for the behavior history. For information necessary for the reservation process, for example, attribute information, the usage control unit 244 may give the use authority to the facility terminal of the designated facility in the target period regardless of whether the designated facility can perform the face authentication.

Here, in the second example embodiment, giving a use authority for predetermined information to a face authentication supporting facility may be giving a use authority such that the facility terminal can refer to the predetermined information. Giving a use authority for predetermined information to a face authentication non-supporting facility may be that the usage control unit 244 transmits the predetermined information of a user who has reserved the facility to the facility terminal of the designated facility.

The image acquisition unit 245 will also be referred to as image acquisition means. The image acquisition unit 245 acquires, from the facility terminal 400 at any location in a site of a facility, a captured image or face feature information generated by a camera located at the location imaging at least a user's face. The image acquisition unit 245 supplies the captured image or the face feature information to the authentication control unit 246.

The authentication control unit 246 will also be referred to as authentication control means. The authentication control unit 246 controls face authentication for a face region of the user U included in the captured image, and specifies the user. That is, the authentication control unit 246 causes the face authentication apparatus 100 to perform face authentication on the captured image acquired from the facility terminal 400. For example, the authentication control unit 246 transmits a face authentication request including the acquired captured image to the face authentication apparatus 100 via the network N. The authentication control unit 246 may extract a face region of the user U from the captured image and cause the extracted image to be included in the face authentication request. The authentication control unit 246 may extract face feature information from the face region and cause the face feature information to be included in the face authentication request. The authentication control unit 246 receives a face authentication result from the face authentication apparatus 100. As a result, the authentication control unit 246 specifies the user ID of the user.

The processing control unit 247 executes processing according to the face authentication result. In the second example embodiment, in a case where a viewing request for the user information has been received from the facility terminal 400 and the face authentication has succeeded, the processing control unit 247 transmits the user information of the specified user, which is user information within the use authority of the facility, to the facility terminal 400 that is a request source. As a result, the facility terminal 400 displays the user information. In a case where a request for recording a behavior history at a location has been received from the facility terminal 400 and the face authentication has succeeded, the processing control unit 247 causes the registration unit 241 to add the behavior history of the user to the user information associated with the face information of the user. As a result, the behavior history of the user can be easily collected.

Figure 11:
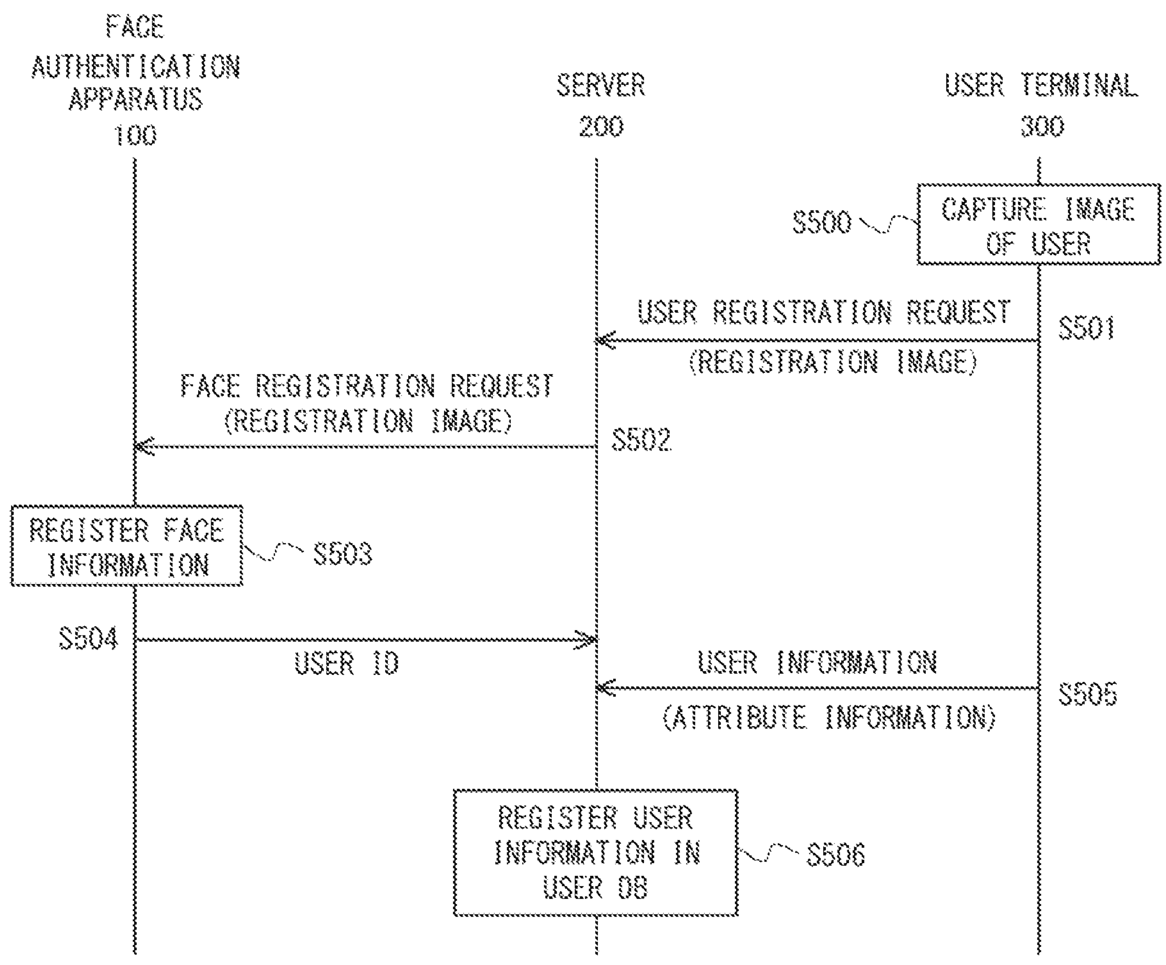
FIG. 11 is a sequence diagram illustrating an example of a flow of a user registration process according to the second example embodiment.

FIG. 11 is a sequence diagram illustrating an example of a flow of a user registration process according to the second example embodiment. First, the user terminal 300 images the user U (S500), and transmits a user registration request including a registration image generated through imaging to the server 200 (S501). The registration unit 241 of the server 200 causes the registration image included in the received user registration request to be included in a face registration request and transmits the face registration request to the face authentication apparatus 100 (S502). The face authentication apparatus 100 registers the face information (face feature information) of the user U on the basis of the registration image included in the received face registration request (S503). The face authentication apparatus 100 notifies the server 200 of the issued user ID (S504). The user terminal 300 receives an input of user information from the user, and transmits the user information to the server 200 (S505). The user information transmitted here includes attribute information of the user. The registration unit 241 of the server 200 registers the sent user ID and user information in the user DB 212 in association with each other (S506).

Figure 12:
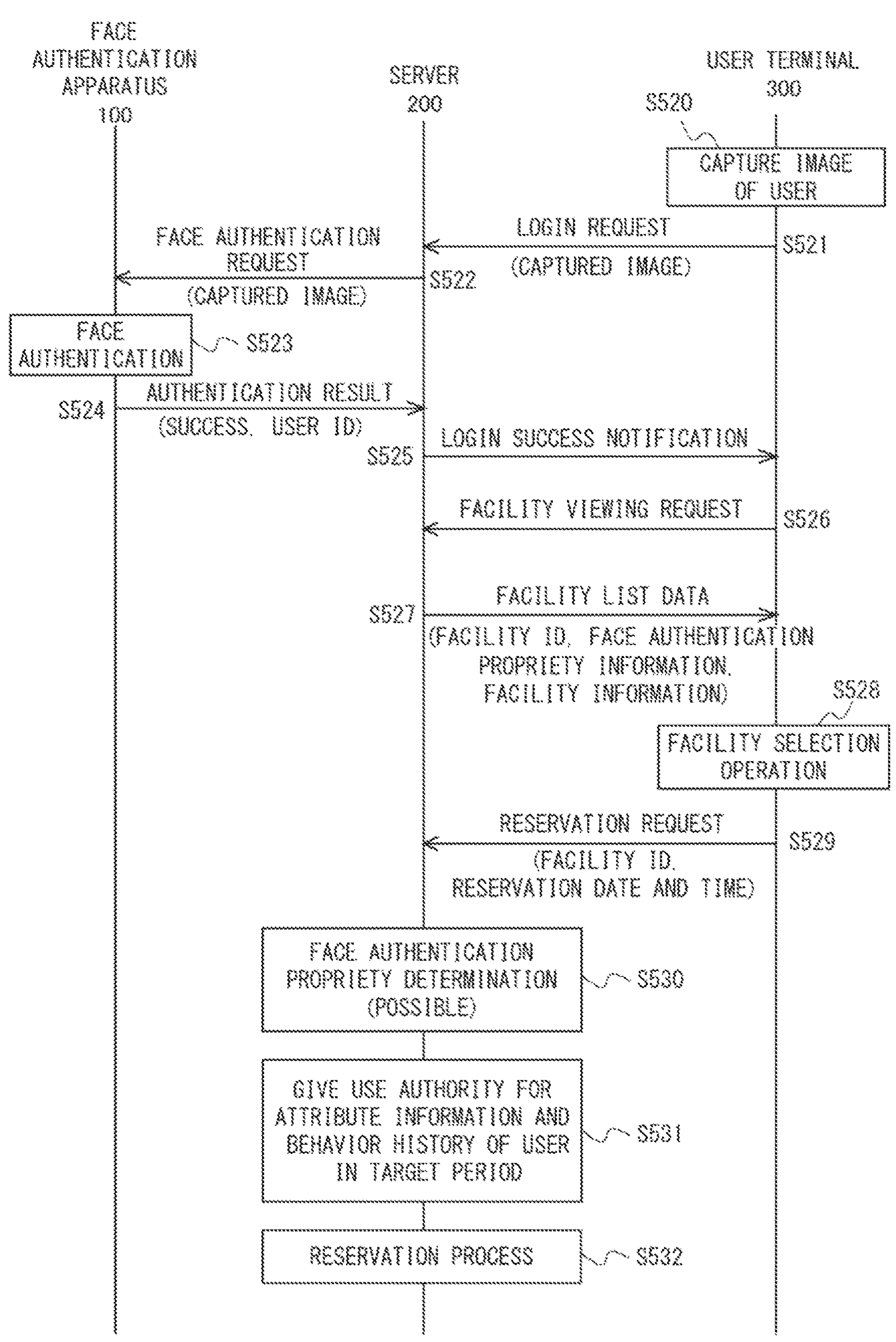
FIG. 12 is a sequence diagram illustrating an example of a flow of a reservation process according to the second example embodiment.
Figure 13:
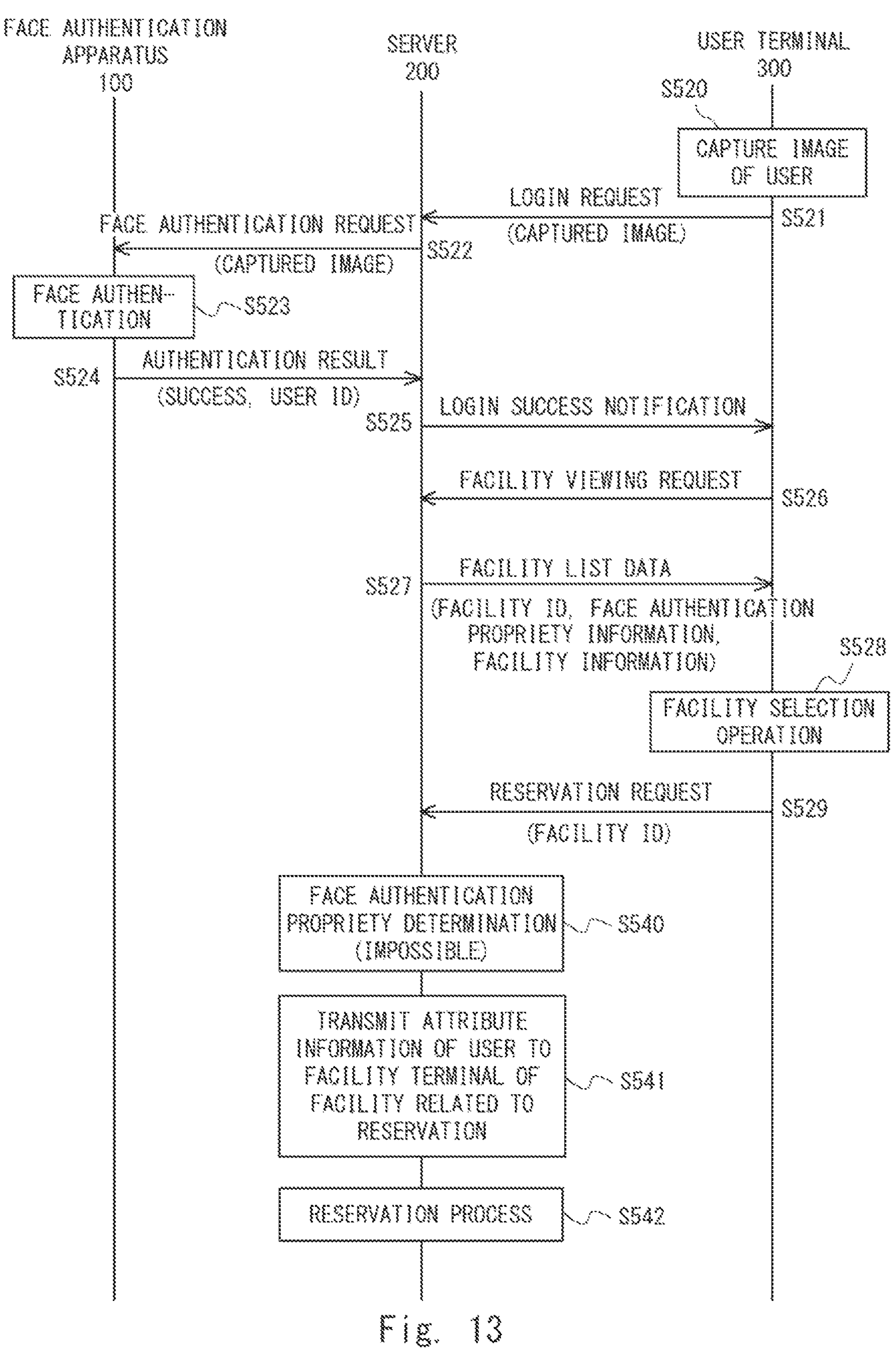
FIG. 13 is a sequence diagram illustrating an example of a flow of the reservation process according to the second example embodiment.

FIGS. 12 and 13 are sequence diagrams illustrating an example of a flow of a reservation process according to the second example embodiment. FIG. 12 illustrates a flow of a reservation process on a face authentication supporting facility, and FIG. 13 illustrates a flow of a reservation process on a face authentication non-supporting facility. In the following description, a user can log in to a reservation site through face authentication, but a login method is not limited thereto, and for example, it may be possible to log in by the user inputting a user ID and a password.

First, FIG. 12 will be described. The user terminal 300 images the user (S520), and transmits a login request including a captured image to the server 200 (S521). As a result, the image acquisition unit 245 of the server 200 acquires the login request. Next, the authentication control unit 246 of the server 200 transmits a face authentication request for a face region of the user U in the captured image to the face authentication apparatus 100 (S522). The face authentication apparatus 100 performs face authentication for the face region of the user U in the captured image included in the received face authentication request (S523). Here, it is assumed that there is a user ID that has succeeded in face authentication. The face authentication apparatus 100 transmits the fact that the face authentication has succeeded and the face authentication result including the user ID to the server 200 (S524). The authentication control unit 246 of the server 200 specifies the user from the user ID included in the face authentication result.

Next, the server 200 notifies the user terminal 300 of the successful login (S525). The user terminal 300 transmits a viewing request for the facility information to the server 200 (S526).

The list transmission unit 242 of the server 200 transmits facility list data including a set of the face authentication propriety information and the facility information for each facility ID stored in the facility list 213 to the user terminal 300 (S527). As a result, the user terminal 300 displays the facility list data.

The user views the facility list data and executes an operation of selecting a designated facility (S528). The user terminal 300 that has received the operation transmits a reservation request including the facility ID of the designated facility and the reservation date and time to the server 200 (S529).

Next, the determination unit 243 of the server 200 refers to the facility list 213 and determines whether the designated facility is a face authentication supporting facility (S530). In this example, it is assumed that the designated facility is a face authentication supporting facility. In this case, the usage control unit 244 of the server 200 determines a target period according to the reservation date and time, and gives the facility terminal of the designated facility a use authority of the attribute information and the behavior history of the user in the target period, stored in the user DB 212 (S531). The usage control unit 244 executes a reservation process (S532). The reservation process is to record the reservation date and time, the user ID, and the data use authority in a record of the designated facility in the reservation DB 214. However, in addition to this, reservation information including the reservation date and time and the user ID may be transmitted to the facility terminal of the designated facility. The recording of the data use authority may be to store a certificate of the use authority in the data use authority of the reservation DB 214, or may be to store the attribute information and the behavior history of the user in a storage medium used for processing related to service provision in the facility in a target period. The usage control unit 244 may transmit the information for which a use authority is given to the facility terminal of the designated facility instead of recording the data use authority.

Next, FIG. 13 will be described. First, the information processing system 1000 executes processes similar to S520 to S529. Next, the determination unit 243 of the server 200 refers to the facility list 213 and determines whether the designated facility is a face authentication supporting facility (S540). In this example, it is assumed that the designated facility is not a face authentication supporting facility. In this case, the usage control unit 244 of the server 200 transmits the attribute information of the user stored in the user DB 212 to the facility terminal of the designated facility related to the reservation (S541). The usage control unit 244 executes a reservation process (S542). The reservation process in this case is to record the reservation date and time and the user ID in the record of the designated facility in the reservation DB 214. The usage control unit 244 may record the data use authority given in the reservation process.

As described above, according to the information processing system 1000, in a case where the user makes a reservation from a reservation site, when the facility to be reserved is a face authentication supporting facility, various types of information associated with the face information are automatically cooperated with the facility.

According to the information processing system 1000, in the reservation process, the user information can be widely used for service provision in the face authentication supporting facility, so that the use of the user information can be facilitated, and the service provision in the face authentication supporting facility can be facilitated. On the other hand, by providing the minimum user information necessary for completing the reservation to the face authentication non-supporting facility, it is possible to prevent the non-intended use of the customer data.

Figure 14:
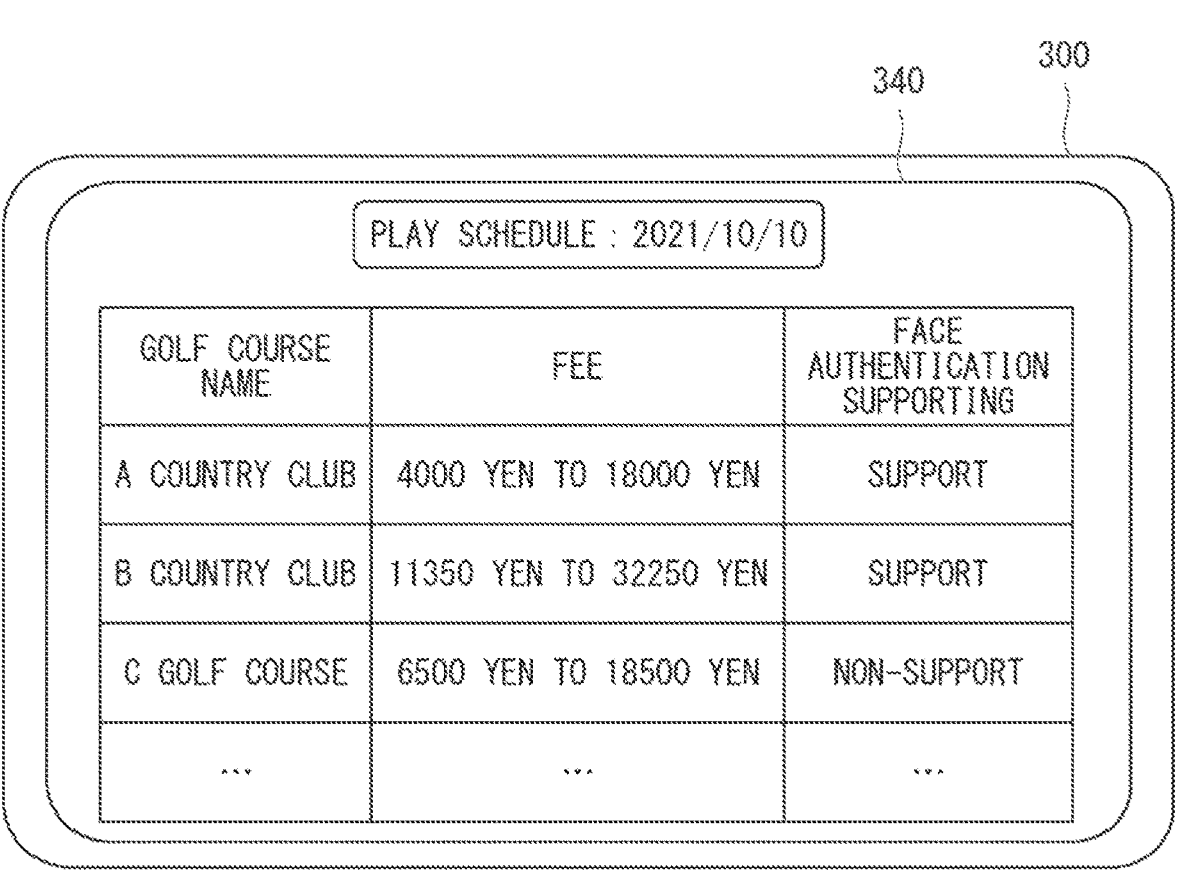
FIG. 14 is a diagram illustrating an example of display on the user terminal according to the second example embodiment.

FIG. 14 is a diagram illustrating an example of display on the user terminal 300 according to the second example embodiment. FIG. 14 illustrates an example of a display screen in a case where the user terminal 300 displays the facility list data in S527 to S528 in FIGS. 12 and 13. The display unit 340 displays the reservation date and time (play schedule), a golf course name for each golf course, a fee, and face authentication propriety information. Note that, in a case where the user terminal 300 displays the facility list data, display modes may be made different depending on whether the facility can perform the face authentication or cannot perform the face authentication. For example, the user terminal 300 may increase a character size or color or change a font of information regarding a golf course where the face authentication is possible, compared with information regarding a golf course where the face authentication is impossible. The user terminal 300 may superimpose a mark indicating "face authentication is possible" in the vicinity of a display position of the information regarding the golf course where the face authentication is possible. The user terminal 300 may raise the display order of the information regarding the golf course where the face authentication is possible compared with the information regarding the golf course where the face authentication is impossible. As a result, since a user can ascertain a face authentication supporting facility at a glance, it is easy to select a facility to be reserved.

Figure 15:
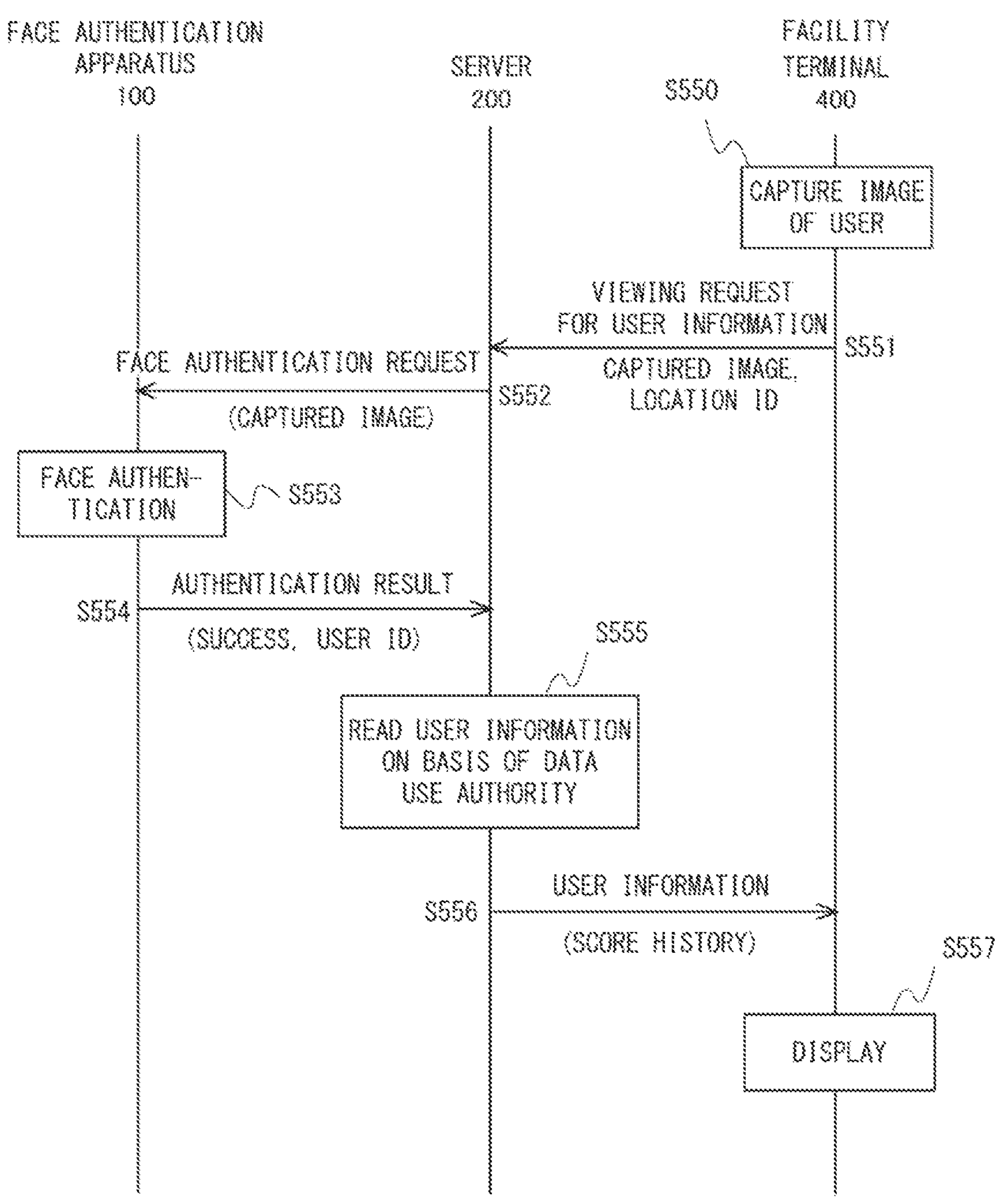
FIG. 15 is a sequence diagram illustrating an example of a flow of a display process on the facility terminal according to the second example embodiment.

FIG. 15 is a sequence diagram illustrating an example of a flow of a display process on the facility terminal 400 according to the second example embodiment. The display process is performed when a user visits any location in the site of the facility. First, the facility terminal 400 images at least the face of the user who has visited the site (S550), and transmits a viewing request for user information (S551). The viewing request may include a captured image and a location ID. As a result, the image acquisition unit 245 of the server 200 acquires the captured image.

Next, the information processing system 1000 executes S552 to S554 similar to S522 to S524 in FIG. 12. As a result, the authentication control unit 246 of the server 200 specifies the user.

The processing control unit 247 of the server 200 checks the data use authority of the facility in the reservation DB 214, and reads the user information of the specified user, the user information being within the use authority (S555). The processing control unit 247 transmits the read user information to the facility terminal 400 that is a viewing request source (S556). The read and transmitted user information is, for example, a score history of the user. The facility terminal 400 that has received the user information displays the user information (S557).

Note that, in the reservation process, in a case where the server 200 has transmitted the user information for which the use authority is given to the facility terminal 400, the facility terminal 400 may transmit a captured image to the face authentication apparatus 100 and receive a face authentication result from the face authentication apparatus 100. The facility terminal 400 may read and display the stored user information on the basis of the face authentication result.

Figure 16:
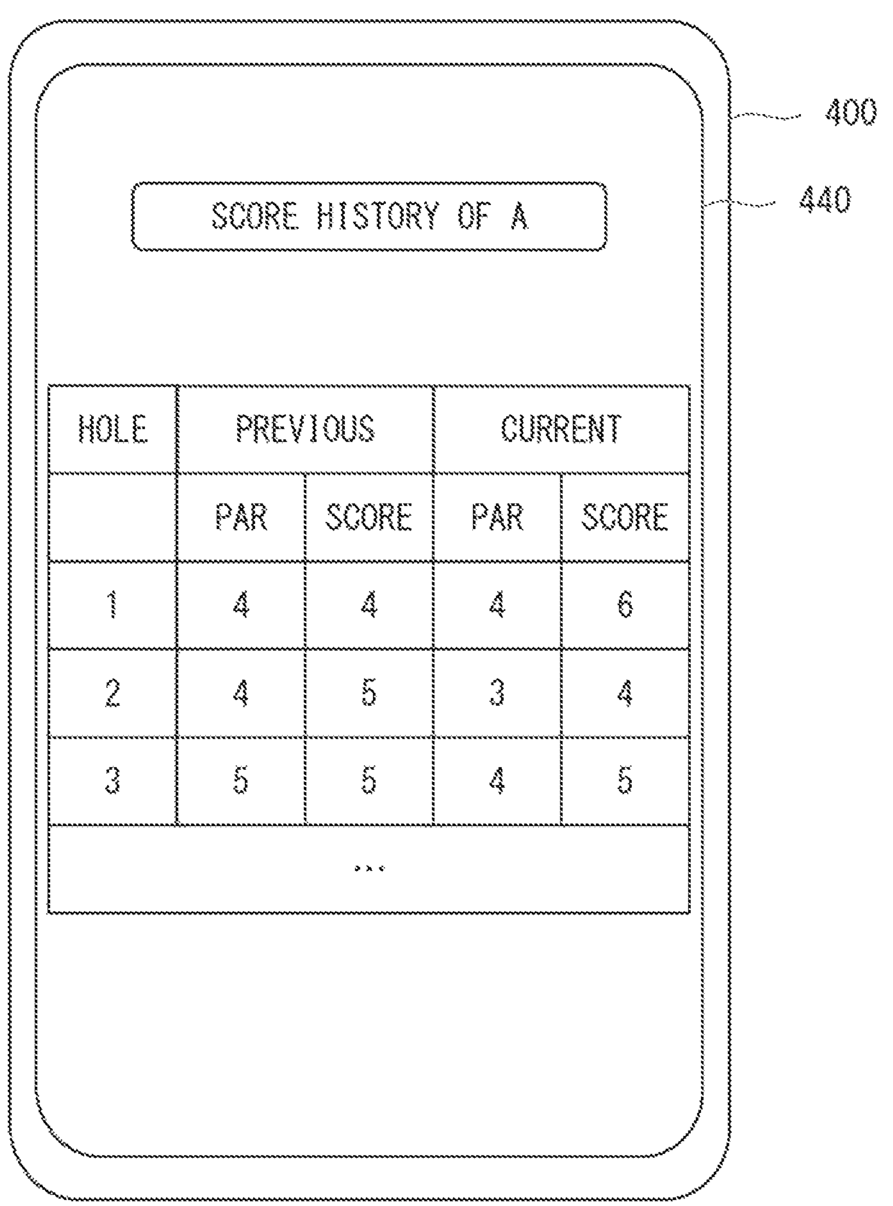
FIG. 16 is a diagram illustrating an example of display on the facility terminal according to the second example embodiment.

FIG. 16 is a diagram illustrating an example of display on the facility terminal 400 according to the second example embodiment. On the display unit 440 of the facility terminal 400, a score history of the previous round of a visiting user "A" and score data of a hole already completed in the current round are displayed side by side. The user can easily ascertain his/her current tone and degree of improvement by comparing the previous and current scores.

In the above example, in S556 to S557, the server 200 transmits the score history to the facility terminal 400 to display the score history, but a transmission and display destination is not limited to the facility terminal 400. For example, the server 200 may transmit the score history to the user terminal 300 by using a contact address of a user registered in advance or by using short-range wireless communication such as Bluetooth (registered trademark) to display the score history. A transmission and display target is not limited to the score history. For example, the server 200 may cause the facility terminal 400 to display an information code such as a QR code (registered trademark) for accessing the score history and cause the user terminal 300 to read the information code.

As described above, the information processing system 1000 displays the user information within the use authority associated with the user's face information by utilizing the face authentication. The user can easily check his/her own information by viewing the displayed user information. In a case where there is a staff member in the facility, the staff member can provide a service personalized to the user by viewing the displayed user information. Therefore, a service with high added value can be provided.

Note that the user information of the user stored in the user DB 212 may be linked with an application that manages the user information, and the application may be started from the user terminal 300 at the user's desired timing such that the user information can be viewed. As an example, the user may start an application for managing scores from the user terminal 300 to view the scores.

Figure 17:
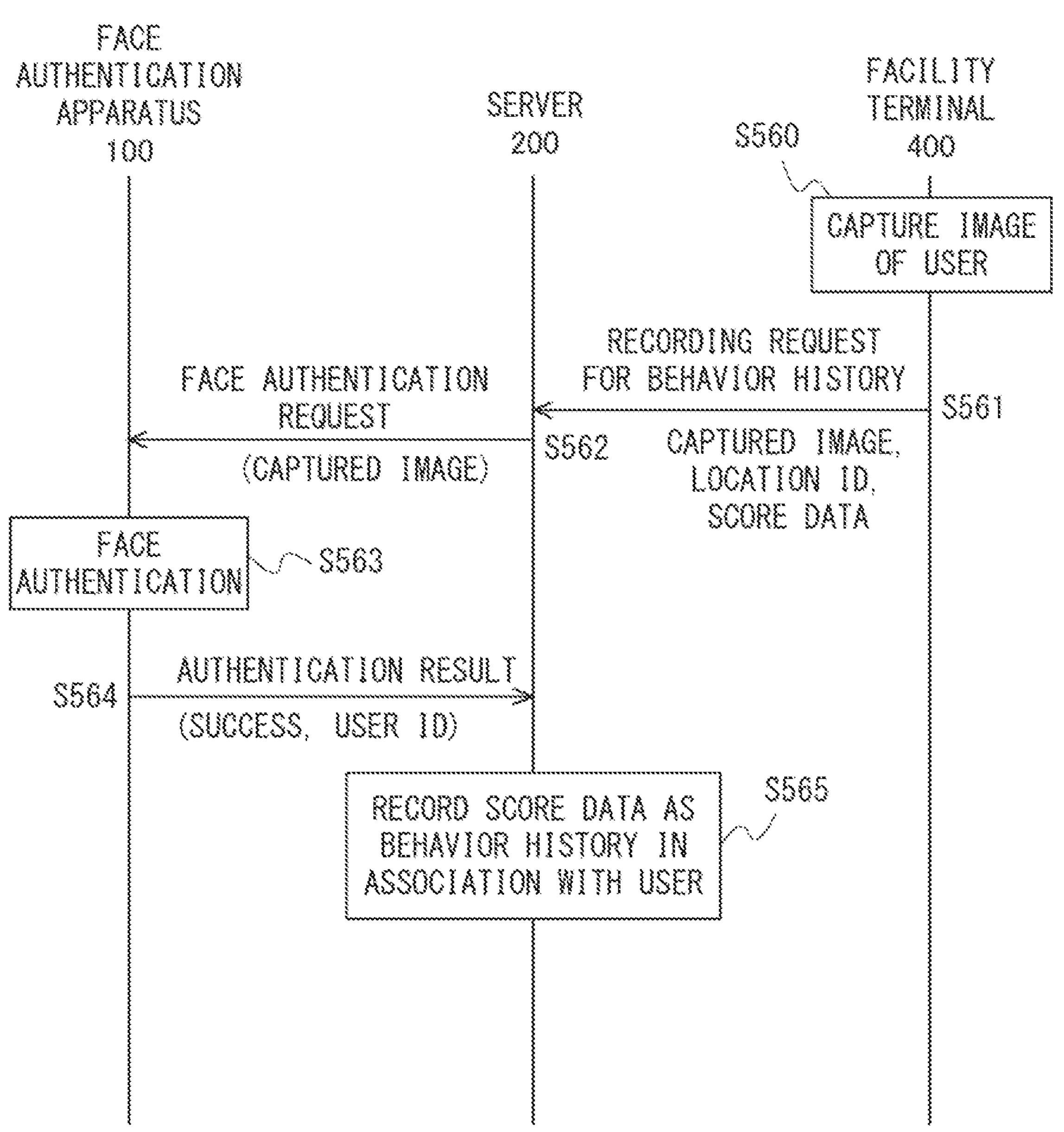
FIG. 17 is a sequence diagram illustrating an example of a flow of a recording process according to the second example embodiment.

FIG. 17 is a sequence diagram illustrating an example of a flow of the recording process according to the second example embodiment. First, the facility terminal 400 images at least a face of a user who has visited a location (S560), and transmits a recording request for a behavior history at the location (S561). For example, the recording request may include a captured image, a location ID, and score data as a behavior history at the location. Note that the facility terminal 400 may receive an input from the user and acquire the score data, may acquire the score data from a score counter used by the user, or may acquire the score data from another sensor. The facility terminal 400 may count the number of swings from an image obtained by imaging motions of the user and generate score data.

The information processing system 1000 executes S562 to S564 similar to S522 to S524 in FIG. 12. As a result, the authentication control unit 246 of the server 200 specifies the user.

In response to an instruction from the processing control unit 247, the registration unit 241 of the server 200 records the score data as a behavior history in the user DB 212 in association with the user ID (S565).

As described above, the information processing system 1000 can easily collect the behavior history by utilizing the face authentication. By collecting the behavior history, it is possible to provide a service with higher added value in a face authentication supporting facility.

Figure 18:
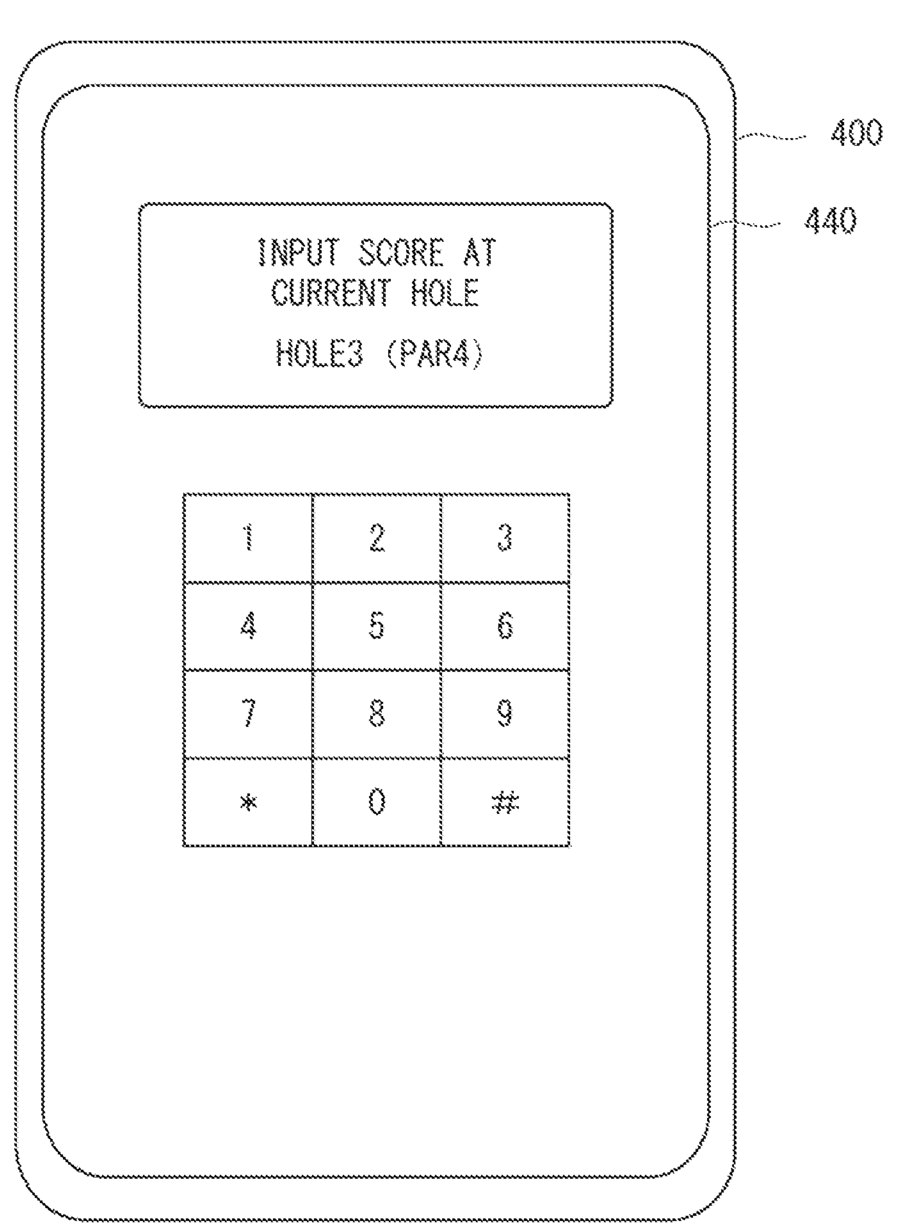
FIG. 18 is a diagram illustrating an example of display on the facility terminal according to the second example embodiment.

FIG. 18 is a diagram illustrating an example of display on the facility terminal 400 according to the second example embodiment. On the display unit 440 of the facility terminal 400 in a case where a golf cart is on the third hole, a keyboard region is displayed together with a message "Please input current scores". This screen is displayed before S561 in FIG. 17. When the user inputs scores by operating the keyboard region, the facility terminal 400 transmits a recording request for a behavior history to the server 200.

Third Example Embodiment

Next, a third example embodiment of the present disclosure will be described. In the third example embodiment, the content of a service to be provided to a user visiting a facility is determined in advance for each position in a site of the facility. The information processing system 1000 provides the user with a service corresponding to a visit location of the user. Specifically, in a case where face authentication has succeeded, the processing control unit 247 of the server 200 executes processing according to a position of a camera that has generates a captured image for face authentication. The processing to be executed may include a user information display process or a behavior history recording process described in the second example embodiment.

FIG. 19 is a diagram illustrating an example of the content of processing for each location according to the third example embodiment. For example, at the location A1 where there is a reception, the processing control unit 247 executes a check-in process and a check-out process. For example, at the location A2 where there is a locker, the processing control unit 247 executes an unlocking process for the locker. The unlocking process for the locker performed by the processing control unit 247 may be to transmit an unlock signal for the locker to a drive unit of the locker via the facility terminal 400 at the location A2. At the location A3 where there is a store, the processing control unit 247 causes the registration unit 241 to add a usage statement acquired from the facility terminal 400 to the behavior history of the user. At the location A4 which is the first hole in the course, the processing control unit 247 causes the registration unit 241 to add the score data acquired from the facility terminal 400 to the behavior history of the user. At the location A12 which is the ninth hole in the course, the processing control unit 247 records the score data described above, causes the facility terminal 400 to make a break announcement, and aggregates the progress in the middle. At the location A21 which is the eighteenth hole in the course, the processing control unit 247 records the score data described above, aggregates the scores, and transmits the aggregation result to the user terminal 300.

Here, in a case where the face authentication has succeeded, the processing control unit 247 may execute processing according to the current status specified from a face authentication history of the user in addition to the position of the camera that has generated the captured image. The face authentication history is a behavior history recorded through the face authentication. The face authentication history used for the processing is, for example, the latest face authentication history. The latest face authentication history may be, for example, a behavior history of today or a behavior history from the latest check-in to the present recorded through the face authentication.

For example, in a case where the facility terminal 400 is located at the location A1 where there is the reception of the facility, the processing control unit 247 causes the registration unit 241 to change information to be recorded as a behavior history depending on whether face authentication for check-in has already been performed. As an example, the registration unit 241 may record check-in data (entrance data) as a behavior history in a case where face authentication for check-in is not performed, and may record check-out data (exit data) as a behavior history in a case where face authentication for check-in has been performed. In a case where the face authentication for check-in has been performed, the processing control unit 247 may perform a settlement process by using a credit card number of the user and settlement information in the facility.

For example, in a case where the facility terminal 400 is located at any location of the golf course, the processing control unit 247 may determine the content of processing on the basis of a hall number specified on the basis of the face authentication history and execute the processing. The hall number may be specified on the basis of the number of times of score input in the facility.

Figure 20:
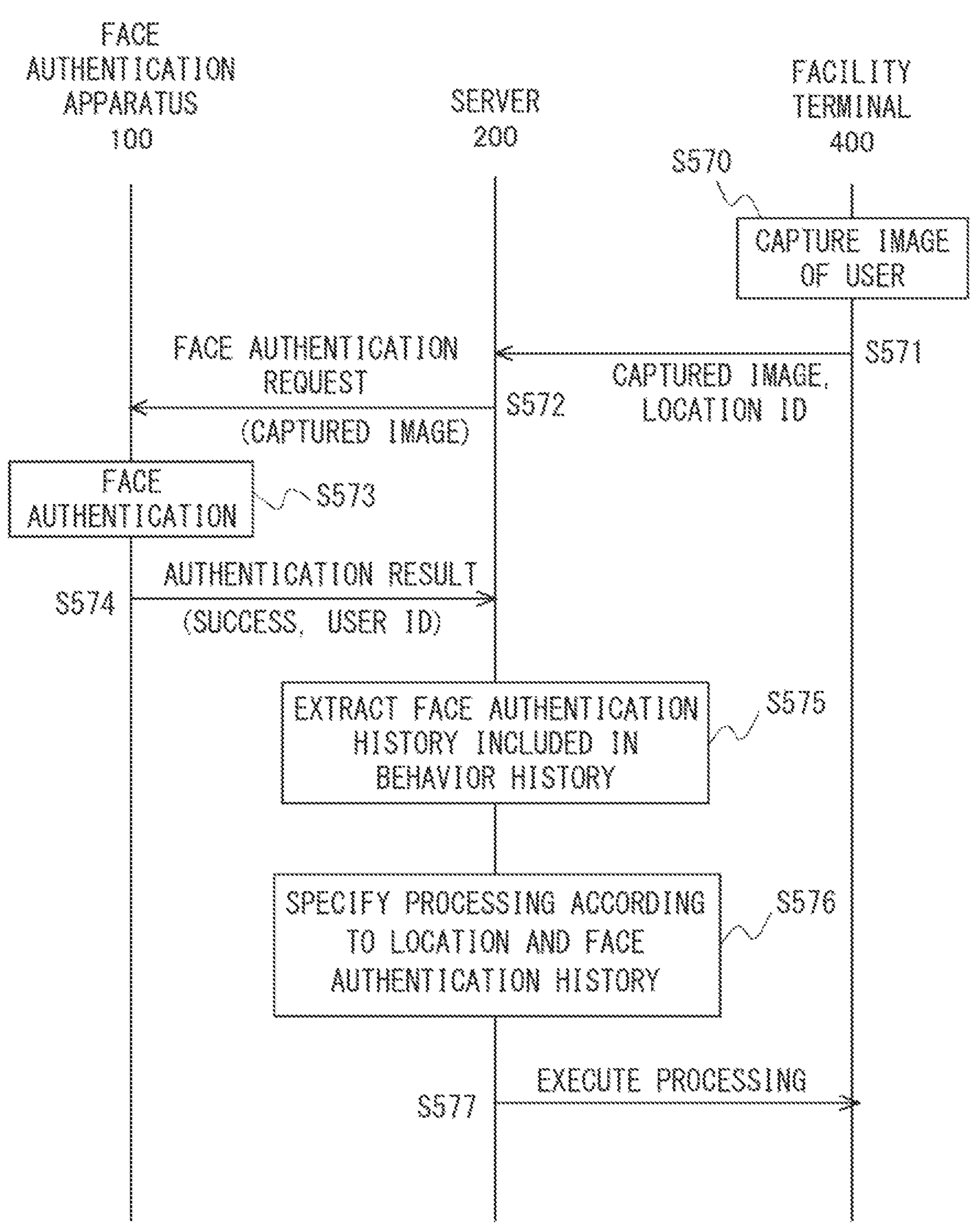
FIG. 20 is a sequence diagram illustrating an example of a flow of control for a facility terminal according to the third example embodiment.

FIG. 20 is a sequence diagram illustrating an example of a flow of control for the facility terminal according to the third example embodiment. First, the facility terminal 400 images at least a face of a user who has visited the location (S570), and transmits a captured image and a location ID (S571).

The information processing system 1000 executes S572 to S574 similar to S522 to S524 in FIG. 12. As a result, the authentication control unit 246 of the server 200 specifies the user.

Next, the processing control unit 247 of the server 200 extracts the latest face authentication history included in a behavior history of the user in the user DB 212 (S575). The processing control unit 247 specifies processing on the basis of the location and the face authentication history (S577). The processing control unit 247 executes the specified processing (S578).

Figure 21:
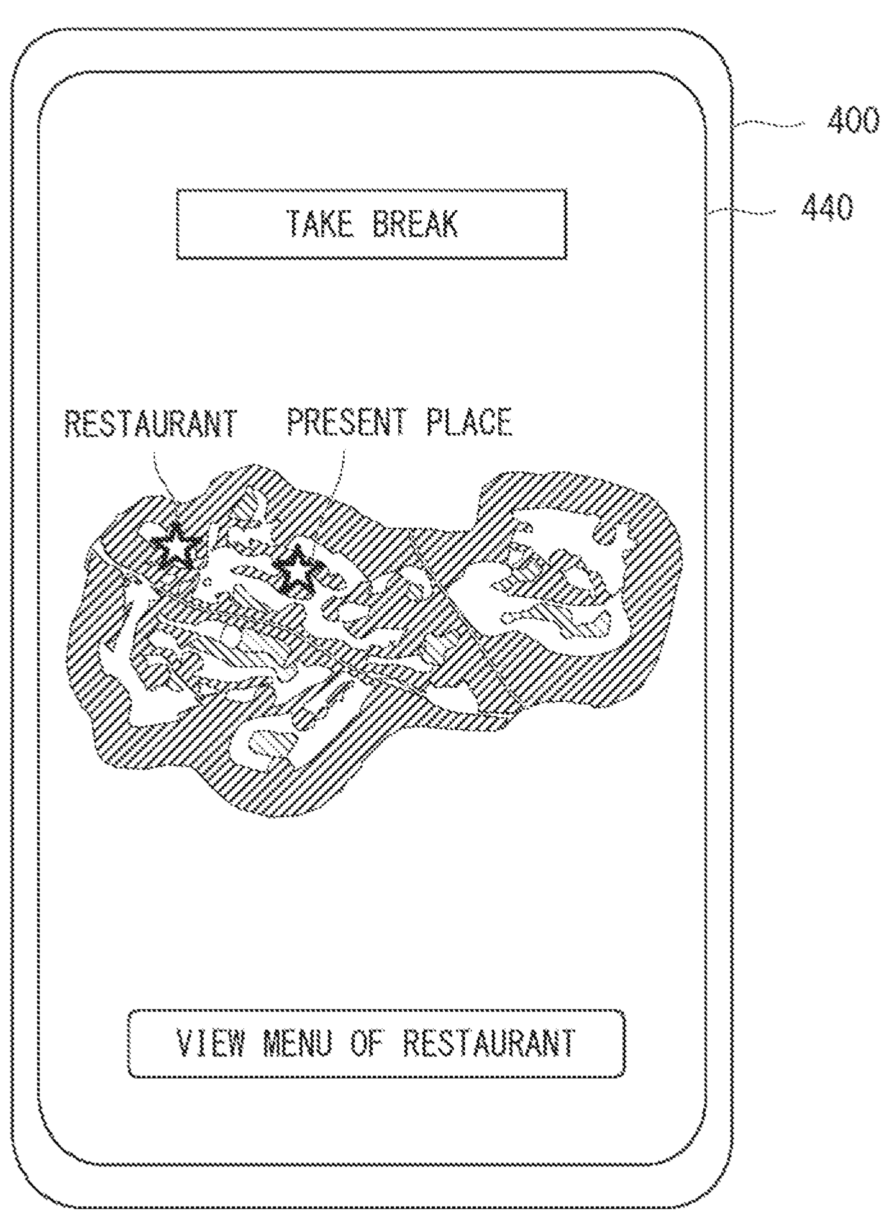
FIG. 21 is a diagram illustrating an example of display on the facility terminal according to the third example embodiment.

FIG. 21 is a diagram illustrating an example of display of the facility terminal 400 according to the third example embodiment. For example, in a case where the location ID is for the location A12 located in the ninth hole, or in a case where the location ID indicates a location in the golf course and the score input has been completed nine times, the processing control unit 247 may display an image for prompting the user to take a break on the facility terminal 400. The display unit 440 may indicate a present place and position information of a restaurant. There may be a configuration in which a user can view a menu of the restaurant from this screen.

Note that, when the user taps a position corresponding to a hole (location) in a course map illustrated in FIG. 21, the facility terminal 400 may acquire a score at the hole from the server 200 and display the acquired score.

As described above, according to the third example embodiment, the server 200 executes processing corresponding to a visit location for a user who has visited a facility. As a result, it is possible to provide various services while reducing an operation burden on a staff member or a user and achieving unmanned operation and labor saving in a facility. The server 200 also executes processing corresponding to the current status of the user to the user who has come to the facility. As a result, it is possible to provide a service according to a status of each user, and thus, the satisfaction level of the user is improved.

In the above-described example embodiment, a configuration of the hardware has been described, but the present invention is not limited thereto. In the present disclosure, any processing can also be realized by causing a processor to execute a computer program.

In the above-described example, the program includes a group of commands (or software codes) for causing the computer to perform one or more functions described in the example embodiments, when read by the computer. The program may be stored in a non-transitory computer-readable medium or a tangible storage medium. As an example and not by way of limitation, the computer-readable medium or the tangible storage medium includes a random-access memory (RAM), a read-only memory (ROM), a flash memory, a solid-state drive (SSD) or any other memory technology, a CD-ROM, a digital versatile disc (DVD), a Blu-ray (registered trademark) disc or any other optical disk storage, a magnetic cassette, a magnetic tape, a magnetic disk storage, and any other magnetic storage apparatus. The program may be transmitted on a transitory computer-readable medium or a communication medium. As an example and not by way of limitation, the transitory computer-readable medium or the communication medium includes propagated signals in electrical, optical, acoustic, or any other form.

Note that the present disclosure is not limited to the above example embodiment, and can be appropriately changed without departing from the scope. In the second and third example embodiments, the example in which the facility is a golf course has been described, but the facility may be a fitness gym, a hotel, or another facility in a form in which the facility is reserved in advance and used on the day. For example, in a case where the facility is a fitness gym, the behavior history recording request may include, as a behavior history to be recorded, evaluation data of the use time of an apparatus, calorie consumption, or motion instead of the score data. The processing control unit 247 may control the facility terminal 400 to prompt the user to take a break according to the total use time or to output advice for the user according to the evaluation data of the motion.

In the above-described example embodiment, in a case where the viewing request for the facility information has been received from the user terminal 300 via the reservation site, the facility list data according to the request is transmitted to the user terminal 300. However, in addition to this, the reservation site may be configured such that the user can search for the facility information of the face authentication supporting facility. Specifically, in a case where a search request corresponding to the face authentication has been received from the user terminal 300 in the reservation site, the list transmission unit 242 may transmit a facility ID and facility information of a face authentication supporting facility as facility list data among the pieces of information included in the facility list 213.

In the above-described example embodiments, the face authentication apparatus 100 has the face authentication function, but the server 200 may have the face authentication function instead of or in addition to the face authentication apparatus 100.

In the above-described example embodiments, the list transmission unit 242, the determination unit 243, the usage control unit 244, the image acquisition unit 245, the authentication control unit 246, and the processing control unit 247 are included in the same server 200, but may be included in another server that can communicate with each other via a network.

Some or all of the above-described example embodiments can be described as in the following Supplementary Notes, but are not limited to the following Supplementary Notes.

Supplementary Note 1

An information processing system including:

list transmission means for transmitting a facility list including facility information regarding one or a plurality of facilities to a user terminal used by a user in a case where a viewing request for facility information regarding a facility that is a reservation candidate has been received from the user terminal;

determination means for, in a case where a reservation request for a designated facility has been received from the user terminal, determining whether or not the facility related to the reservation request is a facility capable of performing face authentication; and usage control means for, in a case where the facility related to the reservation request is a facility capable of performing face authentication, increasing the number of types of user information that is available to an apparatus of the facility related to the reservation request in a target period determined according to the reservation among pieces of user information regarding the user, the user information being registered in association with face information of the user, compared with a case where the facility related to the reservation request is not a facility capable of performing the face authentication.

Supplementary Note 2

The information processing system according to Supplementary Note 1, in which the facility list includes propriety information indicating whether or not the facility is a facility capable of performing the face authentication in association with facility information of each facility.

Supplementary Note 3

The information processing system according to Supplementary Note 1 or 2, in which the usage control means in a case where the facility related to the reservation request is a facility capable of performing the face authentication, makes a behavior history included in user information registered in association with face information of the user available to the apparatus of the facility related to the reservation request in the target period, and in a case where the facility related to the reservation request is not a facility capable of performing the face authentication, does not make the behavior history available to the apparatus of the facility related to the reservation request.

Supplementary Note 4

The information processing system according to Supplementary Note 3, in which the usage control means makes attribute information of the user available to the apparatus of the facility related to the reservation request in the target period.

Supplementary Note 5

The information processing system according to any one of Supplementary Notes 1 to 4, in which the facility is a golf course, and the behavior history includes a score history of golf.

Supplementary Note 6

The information processing system according to any one of Supplementary Notes 1 to 5, further including registration means for registering, for each user, user information regarding the user in association with face information of the user.

Supplementary Note 7

The information processing system according to Supplementary Note 6, further including authentication control means for controlling face authentication based on a captured image of at least a face of a user imaged by any one of cameras located at a plurality of locations on a site of a facility, in which the registration means adds a behavior history of the user to user information associated with face information of the user in a case where the face authentication has succeeded.

Supplementary Note 8

The information processing system according to Supplementary Note 7, further including processing control means for executing processing according to a position of a camera that has generated the captured image in a case where the face authentication has succeeded.

Supplementary Note 9

The information processing system according to Supplementary Note 8, in which, in a case where the face authentication has succeeded, the processing control means executes processing according to the position of the camera that has generated the captured image and a face authentication history of the user.

Supplementary Note 10

An information processing method including:

transmitting a facility list including facility information regarding one or a plurality of facilities to a user terminal used by a user in a case where a viewing request for facility information regarding a facility that is a reservation candidate has been received from the user terminal;

in a case where a reservation request for a designated facility has been received from the user terminal, determining whether or not the facility related to the reservation request is a facility capable of performing face authentication; and in a case where the facility related to the reservation request is a facility capable of performing face authentication, increasing the number of types of user information that is available to an apparatus of the facility related to the reservation request in a target period determined according to the reservation among pieces of user information regarding the user, the user information being registered in association with face information of the user, compared with a case where the facility related to the reservation request is not a facility capable of performing the face authentication.

Supplementary Note 11

A non-transitory computer-readable medium storing a program for causing a computer to execute:

a procedure of transmitting a facility list including facility information regarding one or a plurality of facilities to a user terminal used by a user in a case where a viewing request for facility information regarding a facility that is a reservation candidate has been received from the user terminal;

a procedure of, in a case where a reservation request for a designated facility has been received from the user terminal, determining whether or not the facility related to the reservation request is a facility capable of performing face authentication; and a procedure of, in a case where the facility related to the reservation request is a facility capable of performing face authentication, increasing the number of types of user information that is available to an apparatus of the facility related to the reservation request in a target period determined according to the reservation among pieces of user information regarding the user, the user information being registered in association with face information of the user, compared with a case where the facility related to the reservation request is not a facility capable of performing the face authentication.

REFERENCE SIGNS LIST

10, 1000 INFORMATION PROCESSING SYSTEM
12, 242 LIST TRANSMISSION UNIT
13, 243 DETERMINATION UNIT
14, 244 USAGE CONTROL UNIT
100 FACE AUTHENTICATION APPARATUS
110 FACE INFORMATION DB
111 USER ID
112 FACE FEATURE INFORMATION
120 FACE DETECTION UNIT
130 FEATURE POINT EXTRACTION UNIT
140 REGISTRATION UNIT
150 AUTHENTICATION UNIT
200 INFORMATION PROCESSING APPARATUS (SERVER)
210 STORAGE UNIT
211 PROGRAM
212 USER DB
2121 USER ID
2122 USER INFORMATION
2123 ATTRIBUTE INFORMATION
2124 BEHAVIOR HISTORY
213 FACILITY LIST
2131 FACILITY ID
2132 FACE AUTHENTICATION PROPRIETY INFORMATION
2133 FACILITY INFORMATION
214 RESERVATION DB
2141 FACILITY ID
2142 RESERVATION DATE AND TIME
2143 USER ID
2144 DATA USE AUTHORITY
220 MEMORY
230 COMMUNICATION UNIT
240 CONTROL UNIT
241 REGISTRATION UNIT
245 IMAGE ACQUISITION UNIT
246 AUTHENTICATION CONTROL UNIT
247 PROCESSING CONTROL UNIT
300 USER TERMINAL
310 CAMERA
320 STORAGE UNIT
330 COMMUNICATION UNIT
340 DISPLAY UNIT
350 INPUT UNIT
360 CONTROL UNIT
400 FACILITY TERMINAL
410 CAMERA
420 STORAGE UNIT
430 COMMUNICATION UNIT
440 DISPLAY UNIT
450 INPUT UNIT
460 CONTROL UNIT

What is claimed is:

1. An information processing system comprising:

at least one memory storing instructions; and at least one processor executing the instructions to:

transmit a facility list including facility information regarding one or a plurality of facilities to a user terminal used by a user in a case where a viewing request for facility information regarding a facility that is a reservation candidate has been received from the user terminal;

in a case where a reservation request for a designated facility has been received from the user terminal, determine whether or not the facility related to the reservation request is a facility capable of performing face authentication; and in a case where the facility related to the reservation request is a facility capable of performing face authentication, increase a number of types of user information that is available to an apparatus of the facility related to the reservation request in a target period determined according to the reservation among pieces of user information regarding the user, the user information being registered in association with face information of the user, compared with a case where the facility related to the reservation request is not a facility capable of performing the face authentication.

2. The information processing system according to claim 1, wherein the facility list includes propriety information indicating whether or not the facility is a facility capable of performing the face authentication in association with facility information of each facility.

3. The information processing system according to claim 1, wherein the at least one processor executing the instructions:

in a case where the facility related to the reservation request is a facility capable of performing the face authentication, make a behavior history included in user information registered in association with face information of the user available to the apparatus of the facility related to the reservation request in the target period, and in a case where the facility related to the reservation request is not a facility capable of performing the face authentication, do not make the behavior history available to the apparatus of the facility related to the reservation request.

4. The information processing system according to claim 3, wherein the at least one processor executing an instruction to make attribute information of the user available to the apparatus of the facility related to the reservation request in the target period.

5. The information processing system according to claim 3, wherein the facility is a golf course, and the behavior history includes a score history of golf.

6. The information processing system according to claim 1, the at least one processor further executing an instruction to register, for each user, user information regarding the user in association with face information of the user.

7. The information processing system according to claim 6, the at least one processor further executing the instructions to:

control face authentication based on a captured image of at least a face of a user imaged by any one of cameras located at a plurality of locations on a site of facility; and add a behavior history of the user to user information associated with face information of the user in a case where the face authentication has succeeded.

8. The information processing system according to claim 7, the at least one processor further executing an instruction to execute processing according to a position of a camera that has generated the captured image in a case where the face authentication has succeeded.

9. The information processing system according to claim 8, wherein, in a case where the face authentication has succeeded, the at least one processor executing an instruction to execute processing according to the position of the camera that has generated the captured image and a face authentication history of the user.

10. An information processing method comprising:

transmitting a facility list including facility information regarding one or a plurality of facilities to a user terminal used by a user in a case where a viewing request for facility information regarding a facility that is a reservation candidate has been received from the user terminal;

in a case where a reservation request for a designated facility has been received from the user terminal, determining whether or not the facility related to the reservation request is a facility capable of performing face authentication; and in a case where the facility related to the reservation request is a facility capable of performing face authentication, increasing a number of types of user information that is available to an apparatus of the facility related to the reservation request in a target period determined according to the reservation among pieces of user information regarding the user, the user information being registered in association with face information of the user, compared with a case where the facility related to the reservation request is not a facility capable of performing the face authentication.

11. A non-transitory computer-readable medium storing a program for causing a computer to execute:

a procedure of transmitting a facility list including facility information regarding one or a plurality of facilities to a user terminal used by a user in a case where a viewing request for facility information regarding a facility that is a reservation candidate has been received from the user terminal;

a procedure of, in a case where a reservation request for a designated facility has been received from the user terminal, determining whether or not the facility related to the reservation request is a facility capable of performing face authentication; and a procedure of, in a case where the facility related to the reservation request is a facility capable of performing face authentication, increasing a number of types of user information that is available to an apparatus of the facility related to the reservation request in a target period determined according to the reservation among pieces of user information regarding the user, the user information being registered in association with face information of the user, compared with a case where the facility related to the reservation request is not a facility capable of performing the face authentication.

* * * * *